United States Patent
Wu et al.

(10) Patent No.: US 9,852,513 B2
(45) Date of Patent: Dec. 26, 2017

(54) TRACKING REGIONS OF INTEREST ACROSS VIDEO FRAMES WITH CORRESPONDING DEPTH MAPS

(71) Applicant: Intel Corporation, Santa Clara, CA (US)

(72) Inventors: Yi Wu, San Jose, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/057,686

(22) Filed: Mar. 1, 2016

(65) Prior Publication Data

US 2017/0256065 A1    Sep. 7, 2017

(51) Int. Cl.
*G06K 9/34* (2006.01)
*G06T 7/20* (2017.01)

(52) U.S. Cl.
CPC .. *G06T 7/2006* (2013.01); *G06T 2207/10016* (2013.01); *G06T 2207/10024* (2013.01)

(58) Field of Classification Search
USPC ........ 382/164, 165, 283, 284; 345/638, 640; 348/576, 586; 358/517, 537, 3.26, 3.27; 386/278, 282
See application file for complete search history.

(56) References Cited

U.S. PATENT DOCUMENTS

| | | | |
|---|---|---|---|
| 7,397,937 B2 | 7/2008 | Schneider et al. | |
| 7,907,793 B1 * | 3/2011 | Sandrew | G06T 11/001 348/576 |
| 8,160,390 B1 * | 4/2012 | Sandrew | G06T 11/001 345/638 |
| 8,224,051 B2 | 7/2012 | Chen et al. | |
| 8,385,684 B2 * | 2/2013 | Sandrew | H04N 13/0267 358/517 |
| 9,189,670 B2 * | 11/2015 | Moed | G06K 7/14 |
| 9,299,152 B2 * | 3/2016 | Lu | G06T 7/0071 |
| 9,465,980 B2 * | 10/2016 | Craig | G06K 9/00369 |
| 2008/0008243 A1 | 1/2008 | Ozdemir | |
| 2010/0290674 A1 | 11/2010 | Kim | |
| 2012/0093361 A1 | 4/2012 | Huang et al. | |

OTHER PUBLICATIONS

J. Owens, A. Hunter, & E. Fletcher. A fast model-free morphology-based object tracking algorithm. In Proc. of British Machine Vision Conference, pp. 767-776, Cardiff, UK, Sep. 2002.

(Continued)

*Primary Examiner* — Anh H Do
(74) *Attorney, Agent, or Firm* — Green, Howard, & Mughal LLP

(57) ABSTRACT

Techniques related to tracking regions of interest across video frames with corresponding depth maps are discussed. Such techniques may include motion tracking feature points of a region of interest, filtering the tracked feature points, determining a center of the region of interest, verifying a depth consistency of the center, and, if the number of tracked feature points falls below a threshold or the center fails depth consistency for a current frame, re-initializing the region of interest in a prior frame.

25 Claims, 7 Drawing Sheets

(56) References Cited

OTHER PUBLICATIONS

B. Babenko, M.-H. Yang, and S. Belongie. Robust object tracking with online multiple instance learning, Pattern Analysis and Machine Intelligence, IEEE Transactions, vol. 33, Issue 8, pp. 1619-1632, Aug. 2011.
Amir Saffari, Christian Leistner, Jakob Santner, Martin Godec, and Horst Bischof, "On-line Random Forests," in 3rd IEEE ICCV Workshop on On-line Computer Vision, 2009, 8 pages.
International Search Report and Written Opinion for International Patent Application No. PCT/US2017/014598, dated May 4, 2017.

* cited by examiner

TRACKING REGIONS OF INTEREST ACROSS VIDEO FRAMES WITH CORRESPONDING DEPTH MAPS

BACKGROUND

Multicamera arrays, lightfield/plenoptic cameras, and cameras using stereo imaging have recently become viable commercial products. Currently, three-dimensional (3D) user experience provided by such devices are typically based on photography effects such as image refocusing, image segmentation, image depth layer effects, image view interpolation, or the like. However, 3D video effects are typically limited. One hindrance to providing 3D video effects is the difficulty in tracking regions of interest across video frames.

In typical 3D videography usage scenarios, the only information provided for tracking a region or object of interest is the selection of the region or object of interest by a user. For example, the user may click an initial object of interest (e.g., an object, person, or the like) in a first frame of the video and the task of the object of interest tracking is to estimate the position of the object of interest across the video frames. Such tracking of a prior unknown object may be characterized as model free object tracking, which may not require any domain specific knowledge or training. Typically, model free object tracking approaches assume the object being tracked does not change in appearance across video frames. In some instances, model free object tracking techniques may fail due to challenges associated with various appearance changes across frames due to changes in the object of interest and/or camera pose and changes in global or local illumination. Furthermore, since the object of interest is not known beforehand, it is impossible to employ offline machine learning techniques to account for the variability of the appearance of the object of interest due to such changes. Online learning techniques may be applied in the context of model free object tracking to adapt an object model to changes in the appearance of the object. However, updating the object model may introduce errors and such techniques may not provide reliable object tracking.

Current techniques may be inadequate for reliably tracking objects or regions of interest across video frames. It is with respect to these and other considerations that the present improvements have been needed. Such improvements may become critical as the desire to provide 3D video effects in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
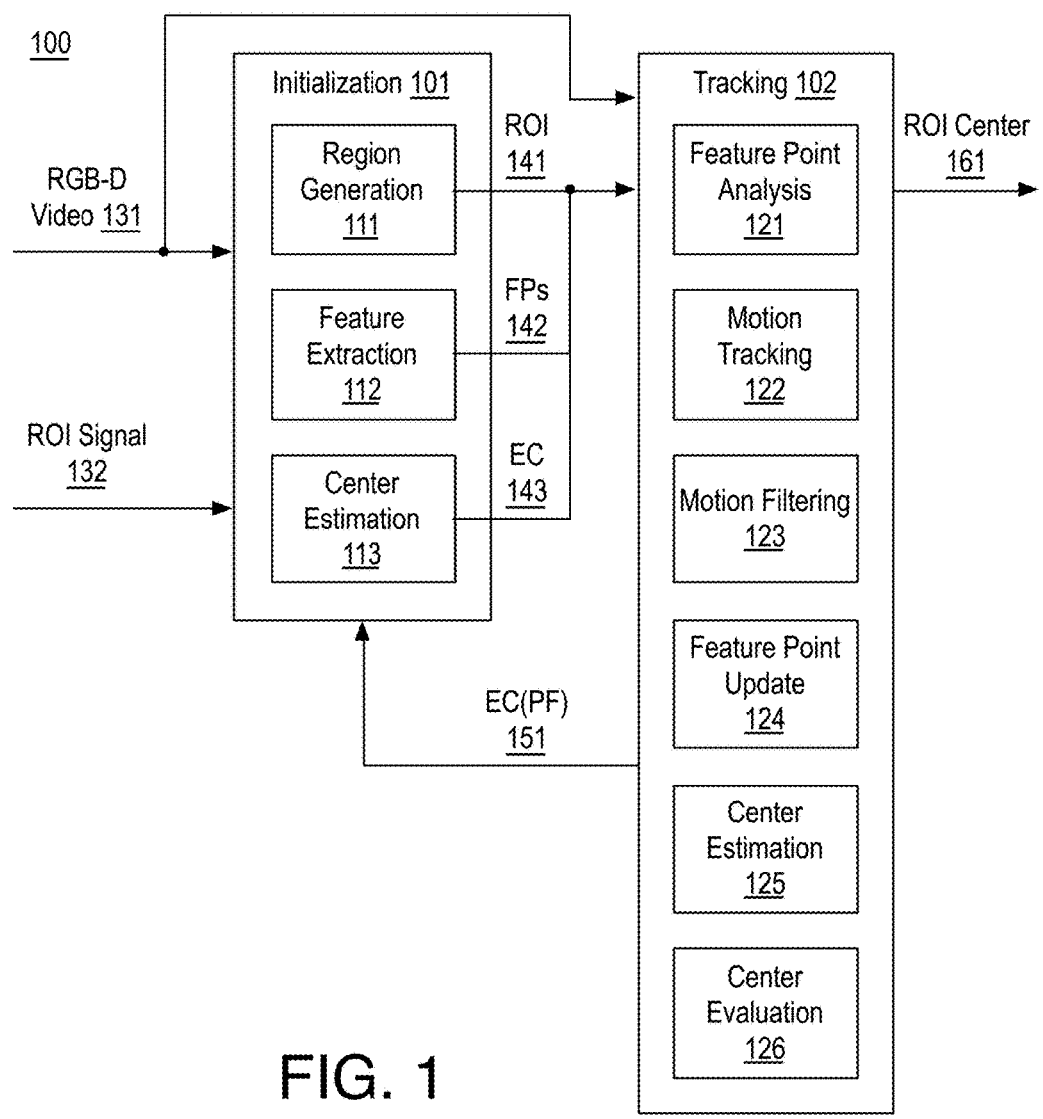
FIG. 1 illustrates an example system for tracking a region of interest across video frames have corresponding depth data.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to region of interest tracking across video frames.

As described above, in some example 3D videography usage scenarios, the only information provided for tracking a region or object of interest across video frames by a device may be the selection of the region or object of interest by a user or another component of the device. Such tracking of a prior unknown object may be characterized as model free object tracking. As discussed further herein, model free tracking according to the provided techniques may use color and depth information to track regions of interest in video having corresponding depth data. For example, regions of interest may be tracked across RGB-D video that includes red, green, and blue channels as well as depth values for pixels of each video frame. Such tracking techniques may address the difficulties of appearance changes caused by changes in the object pose or camera pose, local illumination, or global illumination across video frames. Furthermore, the tracking techniques discussed herein may allow for compelling 3D video effects such as video refocusing, video segmentation, video layer effects, or the like.

In some embodiments, a region of interest may be indicated by a user or a device component or the like. As used herein, the term region of interest may be associated with or represent a region, object, or the like that a user or the device indicates for tracking. The region may be associate with any image region such as a person, a portion of a person, a face, an object, or the like. For example, a user may click on a person or object and the region of interest tracking techniques discussed herein may attempt to track the clicked person or object across video frames having color information and depth information.

In an embodiment, based on the clicked or provided indicator corresponding to a region of interest in a particular frame (e.g., a first frame in the tracking), the region of interest for tracking may be generated or determined by a region grow operation. For example, the region grow operation may connect similarly colored and similar depth areas from the clicked or provided location (e.g., a seed location) to generate the region of interest. Feature points may then be extracted based on the region of interest. For example, the feature points may be extracted based on feature extraction parameters (e.g., parameters defining how feature extraction is to be performed) such that the feature points correspond to corners or other features. If the number of feature points is insufficient (e.g., less than a threshold), feature extraction may be repeated with other feature extraction parameters until a threshold number of feature points are extracted. A center of the region of interest may then be estimated for the tracked region of interest. For example, the effective or approximated center may be determined based on an average of the extracted feature points or the like. Furthermore, pairwise distances and angles between feature points and offset vectors for feature points may be determined.

At any subsequent frame (e.g., a current frame), motion tracking of the region of interest may be performed using optical flow techniques or the like. The feature points in the current frame may then be filtered to reduce errors. For example, the feature points may be filtered based on a comparison of, for each feature point, a color difference between a window around the feature point at the current frame and a window around the feature point at the previous frame to a threshold and a depth difference in a window around the feature point at the current frame and a window around the feature point at the previous frame to another threshold. For example, if both differences do not exceed their respective thresholds, the feature point may be kept and if either differences exceeds its respective threshold, the feature point may be discarded. If the number of remaining feature points is less than a threshold, the region of interest may be re-initialized in the previous frame as discussed above such that a new region of interest, new feature points, a new center, and the like are provided for the previous frame. Such re-initialization may, in some examples, be characterized as a re-tracking, region of interest re-generation, or the like.

If the number of feature points is not less than the threshold (e.g., tracking has been successful), an effective center for the tracked region of interest in the current frame may be generated. The effective center for the tracked region of interest in the current frame may be scale and rotation adjusted (e.g., instead of a simple average of feature points) as is discussed further herein. For example, the feature points may be clustered after factoring in a scale and rotation offset and those feature points in the cluster having the most feature points may be used to determine the effective center. Such techniques may provide a more robust effective center as compared to simple averaging. The depth of the effective center of the current frame may be compared to the depth of the effective center of the previous frame and, if the depth difference does not exceed a threshold, the effective center may be accepted and the described processing may continue with motion tracking of the region at a subsequent frame.

If the depth difference is greater than the threshold, the effective center may be rejected and the region of interest may be re-initialized in the previous frame as discussed above such that a new region of interest, new feature points, a new center, and the like are provided for the previous frame. Motion tracking may then be attempted again for the current frame as discussed. Such re-initialization based on a rejected effective center may provide a verification that the depth of the effective center of the region of interest has not changed dramatically, which may indicate a mistaken or inaccurate approximated center. Furthermore, re-initialization in response to a rejected center or a number of feature points being less than a threshold (as discussed above) may provide for a newly generated region of interest when tracking becomes difficult. For example, such techniques may provide tracking across video frames that is more robust to a changes in shape of the region of interest, fast motion of the region of interest, changes in appearance of the region of interest, or the like.

Such techniques may provide a framework for tracking a region or regions of interest in color video having depth data (e.g., RGB-D video or the like) such that challenges of appearance changes caused by changes in object pose, camera pose, local illumination, global illumination, or the like across video frames may be overcome. The techniques discussed herein may, for example, track sparse feature points in the region of interest across frames to reduce or eliminate the impact of illumination changes, require the depth and color of feature points in the region of interest to not change dramatically between adjacent frame, require a depth consistency check to reduce or eliminate tracking errors and/or region of interest center estimation errors, adaptively add new points to the region of interest to accommodate object appearance changes, update a center of the tracked region of interest by incorporating the scale and rotation change of the region of interest, and cluster feature points by movement and use the motion of a majority cluster to update the center of the region of interest. Such techniques may improve the robustness of center tracking and reduces noise. Furthermore, re-initialization of tracking (e.g., region of interest re-initialization) when a robustness check is failed (e.g., the depth of the effective center changes more then a threshold or the number of feature points falls below a threshold) may provide robustness of tracking across frames as the appearance of the region of interest changes and for fast moving regions of interest.

FIG. 1 illustrates an example system 100 for tracking a region of interest across video frames have corresponding depth data, arranged in accordance with at least some implementations of the present disclosure. As shown in FIG. 1, system 100 may include an initialization module 101 including a region generation module 111, a feature extraction module 112, and a center estimation module 113 and a tracking module 102 including a feature point analysis module 121, a motion tracking module 122, a motion filtering module 123, a feature point update module 124, a center estimation module 125, and a center evaluation module 126. System 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

Also as shown, system 100 (e.g., via initialization module 101 and tracking module 102) may receive RGB-D video 131 and a region of interest (ROI) signal 132 and system 100 may provide (e.g., via tracking module 102) a region of interest (ROI) center 161. Although discussed with respect to RGB-D video 131 for the sake of clarity of presentation, any video including one or more luma and/or color components and corresponding depth information or data may be provided to system 100. In an embodiment, RGB-D video 131 may include a red, a green, and a blue channel for each pixel of each frame of video and corresponding depth data for each pixel (or at a different resolution). For example, RGB-D video 131 may be received from a camera, camera array, image preprocessor, or the like. For example, the camera, camera array, image preprocessor may include any number of cameras for RGB-D video 131. For example, a camera array may include any suitable number of cameras arranged in a grid, in a line, or the like. In an embodiment, RGB-D video 131 may be attained using any suitable system such as a lightfield/plenoptic camera or the like.

Figure 2:
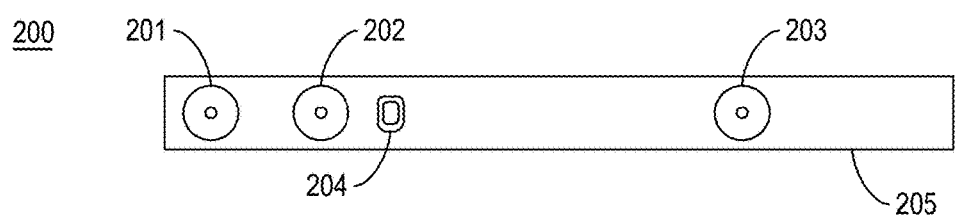
FIG. 2 illustrates an example device for generating video frames have corresponding depth data.

FIG. 2 illustrates an example device 200 for generating video frames have corresponding depth data, arranged in accordance with at least some implementations of the present disclosure. As shown in FIG. 2, device 200 may include an infrared (IR) camera 201, a color (e.g., RGB) camera 202, an infrared (IR) camera 203, and an infrared (IR) transmitter 204 implemented within a housing 205. For example, infrared transmitter 204 may illuminate a scene with infrared light and infrared cameras 201, 203 may attain stereo infrared images (e.g., left/right, reference/target, or the like) images based on the scene and the illumination provided via infrared transmitter 204. In some examples, infrared transmitter 204 may provide infrared illumination having a predetermined pattern or the like. In some examples, device 200 may include a stereo matching module (not shown) to generate a depth image based on the attained stereo infrared images. As shown, in some examples, depth images may be generated based on infrared images or image data. In other examples, depth images may be generated based on color images (e.g., RGB images or image data) or any other suitable images or image data. In an embodiment, system 100 as discussed herein may be implemented via device 200. In some embodiments, video frames having corresponding depth maps or depth data and/or system 100 may be implemented via multicamera arrays, lightfield/plenoptic cameras, cameras using stereo imaging, or the like in any suitable form factor.

Returning to FIG. 1, system 100 (e.g., via initialization module 101) may also receive region of interest signal 132. Region of interest signal 132 may be received via a user (e.g., via the user providing an input to system 100 via a touch display, mouse click, or the like) or region of interest signal 132 may be received via another module of system 100 (e.g., an object recognition module or the like). Region of interest signal 132 may include any suitable data representing or indicating a region of interest within a frame of video or a frame of an image or the like. In an embodiment, region of interest signal 132 may include a coordinate or pixel location, (x, y), corresponding to a region of interest for tracking. As discussed, the region of interest may include any region or portion of a video or picture frame, object, person, face, or the like.

For example, given a video stream of frames, $(F_0, F_1, \ldots, F_N)$, as provided by RGB-D video 131 such that each frame includes RGB (e.g., a red, a green, and a blue value for each pixel of each frame) and depth information (e.g., a depth value or a disparity value for each pixel of each frame), region of interest signal 132 may provide a pixel or pixel location, (x, y), within frame $F_0$ of RGB-D video 131 indicating an object or region of interest for tracking as discussed. As used herein, the term depth data is used to represent either disparity values (e.g., expressed in terms of pixel counts) or depth values (e.g., expressed in terms of a distance).

As shown, based on RGB-D video 131 and region of interest signal 132, region generation module 111 may generate a region of interest 141. For example, region generation module 111 may generate region of interest 141 around the pixel or pixel location indicated by region of interest signal 132. Region generation module 111 may generate region of interest 141 using any suitable technique or techniques. In an embodiment, region of interest 141 may be generated around the pixel or pixel location indicated by region of interest signal 132 using a region grow technique. For example, a flood fill technique may be used to connect similarly colored and similar depth areas from the pixel or pixel location, (x, y), indicated by region of interest signal 132. For example, the indicated pixel or pixel location, (x, y), may be a seed for a region growth operation such that pixels having a color difference and a depth difference within respective thresholds with respect to the color and depth corresponding to pixel or pixel location, (x, y) may be included in region of interest 141. Region of interest 141 may include any suitable data structure representing a region of interest within a frame of a video sequence such as pixel locations within region of interest 141 or the like. For example, region of interest 141 may provide an initial region, object, or the like for tracking.

Based on region of interest 141 as provided by region generation module 111, feature extraction module 112 may extract feature points (FPs) 142. Such feature points may provide more robust tracking as compared to using all pixels in region of interest 141, for example. Feature extraction module 112 may extract feature points 142 using any suitable technique or techniques. In an embodiment, sparse feature points such as corner features or the like may be extracted from region of interest 141. In an embodiment, feature points 142 may be extracted by feature extraction module 112 based on feature extraction parameters (e.g., parameters defining how feature extraction is to be performed). For example, feature points 142 may be extracted based on region of interest 141 and feature extraction parameters. In an embodiment, the number of extracted feature points generated may be compared to a threshold and, if the number of extracted feature points is less than the threshold, feature extraction may be repeated with different feature extraction parameters (e.g., searching for additional or different features) until the threshold is met. Feature points 142 may include any suitable data structure representing feature points corresponding to a region of interest within a frame of a video sequence such as pixel locations of feature points 142 or the like. For example, feature points 142 may provide initial feature points corresponding to region of interest 141 for tracking.

Based on feature points 142 as provided by feature extraction module 112, center estimation module 113 may estimate an effective or estimated center (EC) 143 of region of interest 141. Center estimation module 113 may estimate effective center 143 using any suitable technique or techniques. In an embodiment, center estimation module 113 may estimate effective center 143 as an average of feature points 142. For example, effective center 143 may provide an initial center (center$_0$) corresponding to initial feature points as provided by Equation (1):

$$\text{center}_0 = \frac{1}{M} \sum_{i=1...M} \text{points}[i].pt \quad (1)$$

where center$_0$ may be the estimated initial center, M may be the number of feature points, i may be a counter variable, and points [i].pt may provide the pixel locations of the feature points.

As shown, one or more of region of interest 141, feature points 142, and effective center 143 may be provided to tracking module 102. As discussed, initialization module 101 may provide region of interest 141, feature points 142, and effective center 143 for a frame ($F_0$) of RGB-D video 131. For example, region of interest 141 may be tracked by tracking module based on any of region of interest 141, feature points 142, and effective center 143 as is discussed further herein. Furthermore, based on an estimated center for a particular frame (EC(PF)) 151 initialization module 101 may perform such operations for any frame of RGB-D video 131 as needed. For example, such re-initialization may be performed when a number of feature points at a frame is less than a threshold, when an effected or estimated center at a frame has a depth variance (e.g., depth change with respect to a prior frame) that is greater than a threshold, or the like. Furthermore, initialization module 101 may be utilized for another sequence of video frames, another object selection (e.g., via region of interest signal 132) within the same or different video sequence, or the like.

Figure 3:
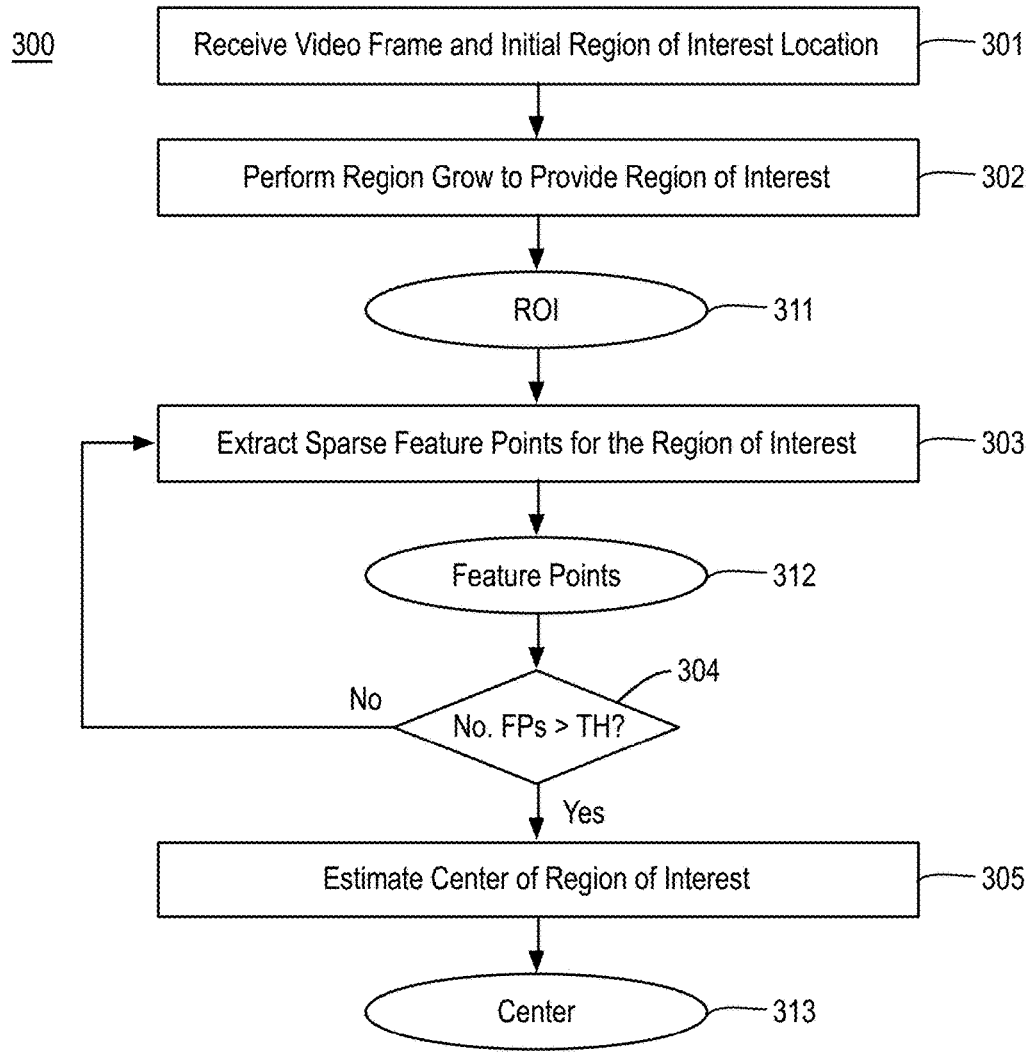
FIG. 3 illustrates an example process for initializing or re-initializing a region of interest.

FIG. 3 illustrates an example process 300 for initializing or re-initializing a region of interest, arranged in accordance with at least some implementations of the present disclosure.

Process 300 may include one or more operations 301-305 to provide outputs 311-313 as illustrated in FIG. 3. Process 300 or portions thereof may be performed by a device or system (e.g., system 100 or any other device or system discussed herein) to initialize a region of interest within a video frame. Process 300 or portions thereof may be repeated for any number regions of interest, video frames, sequences of video frames, or the like.

As shown, process 300 may begin at operation 301, where a video frame and an initial region of interest location may be received. For example, the video frame may include color information and depth information. In an embodiment, the video frame may be an RGB-D video frame. The initial region of interest location may include any suitable indicator of a region of interest such as a pixel location or the like. In an embodiment, the region of interest location may be received via a user providing an input via an input device (e.g., a selection on a touch screen, a selection by mouse click, or the like). In an embodiment, the region of interest location may be received from an object detection module or component or the like. In an embodiment, the region of interest location may be an effective center for a region of interest from a previous or current frame. For example, when providing re-initialization via process 300, the region of interest location may be a previously determined center of a region of interest. For example, as discussed further herein, process 300 may be performed based on an previously determined center of a region of interest based on a number of feature points corresponding to the region of interest being less than a threshold, the effective center corresponding to the region of interest having a depth difference greater than a threshold with respect to a center of the region of interest in a previous frame, or the like.

Processing may continue at operation 302, where a region grow operation may be performed to generate or provide a region of interest. The region grow operation may be performed using any suitable technique or techniques. For example, the region grow operation may include performing a flood fill from the initial region of interest location to connect similarly colored and similar depth areas from the initial region of interest location (e.g., the seed location) to define the region of interest. As shown, operation 302 may generate a region of interest (ROI) 311. Region of interest 311 may correspond to region of interest 141 and may include any suitable data representing a region of interest such as pixel locations within the region of interest or the like.

Processing may continue at operation 303, where feature points may be extracted based on the region of interest. The feature points may be extracted using any suitable technique or techniques. In an embodiment, the feature points may be sparse feature points extracted based on region of interest 311 and feature point extraction parameters such that the feature point extraction parameters define how feature extraction is performed. In an embodiment, the extracted feature points may be corners of region of interest 311 or the like. As shown, operation 303 may generate feature points 312. Feature points 312 may correspond to feature points 142 and may include any suitable data representing feature points such as pixel locations or the like.

Processing may continue at decision operation 304, where a determination may be made as to whether the number of feature points 312 exceeds (or is greater than or equal to) a threshold (e.g., No. of FPs>TH?). The threshold implemented at decision operation 304 may be any suitable value. In an embodiment, the threshold is 100. In some embodiments, the threshold may vary based on the resolution of video frames such that for higher resolutions, the threshold is increased. If not, processing may continue at operation 303 where feature point extraction may be repeated to attain additional feature points. For example, the feature point extraction parameters used at a second iteration of operation 303 may include other feature points of interest in the extraction process. For example, at a first iteration, the feature point extraction parameters may define that only corners are to be extracted while at a subsequent feature point extraction, the feature point extraction parameters may define that additional or other features are to be extracted such as edges, ridges, circles, clusters, or the like. Such features may be in addition to or in the alternative to the features extracted at the first iteration of operation 303. As shown, decision operation 304 and operation 303 may be repeated as needed until the number of feature points 312 exceeds the predetermined threshold. Although shown with the number of feature points If the number of feature points exceeds (or meets) the threshold (either at a first or subsequent iteration), processing may continue at operation 305, where a center of region of interest 311 may be estimated. The center of region of interest 311 may be determined or estimated using any suitable technique or techniques and the center may be referred to as a center, an estimated center, an effective center, or the like. In an embodiment, the center of region of interest 311 may be determined or estimated based on an average location of feature points 312 as discussed with respect to Equation (1). As shown, operation 305 may generate a center 313.

Center 313 may correspond to effective center 143 and may include any suitable data representing a center of a region of interest such as a pixel location or the like.

As discussed, process 300 may provide for an initialization or re-initialization of a region of interest based on an initial location corresponding to the region of interest selected by a user, provided by an object recognition component, or a previously determined center of a tracked region of interest.

Returning to FIG. 1, as shown, RGB-D video 131, region of interest 141, feature points 142 and/or effective center 143 may be provided to tracking module 102. In an embodiment, region of interest 141 may not be provided to tracking module 102 and subsequent processing may be based on feature points 142 and effective center 143 of the region of interest as it is tracked across frames. As will be discussed further herein, such information may correspond to a particular frame of RGB-D video 131 and tracking module 102 may track the region of interest across subsequent frames of RGB-D video 131 to provide region of interest center 161 for each frame of RGB-D video 131 or a particular frequency of frames or the like. Such a time series of region of interest centers 161 may be provided to another component or module of system 100 for use in 3D video processing, to provide 3D videography effects such as video refocusing, video segmentation, video layer effects, or the like. Furthermore, although system 100 illustrates only region of interest center(s) 161 as an output, any data or information such as region of interest 141, feature points 142 or feature points generated by tracking module 102, or the like may be provided by system 100 for use by other components or modules of system 100.

For example, feature point analysis module 121 may receive feature points 142 and, based on feature points 142, feature point analysis module 121 may estimate pairwise distances and angles between feature points 142. For example, for each pair of feature points 142, feature point analysis module 121 may generate a distance and angle. The distance between each pair of feature points 142 may include any suitable distance such as a Euclidean distance and the angle between each pair of feature points 142 may include any suitable angle such as an angle vector or the like. For example, feature point analysis module 121 may generate an M×(M−1)/2 dimensional distance array and angle array (e.g., where M is the number of feature points 142), which may be characterized as OrigDist[M×(M−1)/2] and OrigAngle[M×(M−1)/2], respectively. For example, as used herein the term Original or Orig may correspond to parameters generated based on an initialized or re-initialized video frame.

Furthermore, feature point analysis module 121 may generate an offset vector based on feature points 142 and effective center 143. The offset vector may be generated using any suitable technique or techniques and may provide an M dimensional 2D vector including an offset vector for each of feature points 142 from effective center 143. For example, for each of M feature points 142, a 2D offset vector may be determined as the difference between the location of the feature point and the location of effective center 143 (e.g., center$_0$) in the horizontal and vertical directions (e.g., Δx, Δy). For example, the offset vector may be characterized as OrigOffset[M].

As discussed, feature point analysis module 121 may generate such pairwise distances and angles and the offset vector based on feature points 142, which correspond to an initialization frame (e.g., $F_0$) or a re-initialization frame. For subsequent frames (e.g., tracking from frame $F_{t-1}$ to $F_t$, where t may be 1 for an initialization and any number for a re-initialization), tracking module 102 may track a region of interest across frames. For example, motion tracking module 122 may track motion of the region of interest across frames based on feature points 142 (or feature points for a previous frame). Motion tracking module 122 may perform motion tracking using any suitable technique or techniques such as motion estimation techniques, optical flow techniques, or the like. Furthermore, the output from motion tracking module 122 may include any data or data structures such as updated locations of feature points, vectors indicating motion from feature points of a previous frame to feature points of a current frame, or the like.

Based on the results of motion tracking performed by motion tracking module 122, motion filtering module 123 may filter the results as needed. For example, motion estimation or tracking may be prone to errors due to image noise, intensity variation, motion occlusion, or the like. For example, feature points for a current frame generated by motion tracking module 122 may be filtered by checking the color and/or depth consistency between corresponding feature points between the previous frame and the current frame (e.g., between frame $F_{t-1}$ to $F_t$) to provide a subset of the feature points for tracking with the filtered feature points being discarded. Such color and/or depth consistency may be performed using any suitable technique or techniques. In an embodiment, motion filtering module 123 may, for each pair of corresponding feature points between the frames, determine a color difference between a window around a particular feature point in the previous frame (e.g., frame $F_{t-1}$) and a window around the corresponding feature point in the current frame (e.g., frame $F_t$) and/or a depth difference between a window around the particular feature point in the previous frame (e.g., frame $F_{t-1}$) and a window around the corresponding feature point in the current frame (e.g., frame $F_t$). The color and/or depth differences may be compared to a threshold and, if both are less than (e.g., do not exceed)

their respective thresholds, the feature point for the current frame may be accepted and, if either exceeds its respective threshold, the feature point for the current frame may be rejected.

In an embodiment, motion filtering module 123 may implement Equation (2) to determine the color difference for a particular feature point and Equation (3) to determine the depth difference for a particular feature point:

$$ColorDiff = \tag{2}$$
$$\frac{1}{w_x w_y} \sum_{(w_x, w_y) \in W} (|R_t(i+w_x, j+w_y) - R_{t-1}(i'+w_x, j'+w_y)| +$$
$$|G_t(i+w_x, j+w_y) - G_{t-1}(i'+w_x, j'+w_y)| +$$
$$|B_t(i+w_x, j+w_y) - B_{t-1}(i'+w_x, j'+w_y)|)$$

$$DepthDiff = \tag{3}$$
$$\frac{1}{3w_x w_y} \sum_{(w_x, w_y) \in W} (|D_t(i+w_x, j+w_y) - D_{t-1}(i'+w_x, j'+w_y)|)$$

where ($w_x$, $w_y$) may provide a window, W, around a feature point (i,j) in frame $F_t$ that corresponds to a feature point (i', j') in frame $F_{t-1}$, R may be a red color channel value, G may be a green color channel value, B may be a blue color channel value, D may be a depth value, ColorDiff may be the color difference between the feature point between frames $F_t$ and $F_{t-1}$ and DepthDiff may be the depth difference between the feature point between frames $F_t$ and $F_{t-1}$.

As shown, Equation (2) may provide a difference in color for a window around a feature point in a previous frame and a window around the corresponding feature point in the current frame. Furthermore, Equation (3) may provide a difference in depth for a window around a feature point in a previous frame and a window around the corresponding feature point in the current frame. The windows implemented by Equations (2) and (3) may be the same size and shape or they may be different. As discussed, in an embodiment, if both ColorDiff and DepthDiff are less than respective thresholds, the feature point may be accepted (e.g., not filtered out) and, if either of ColorDiff and DepthDiff exceed there respective threshold, the feature point may be rejected (e.g., filtered out). In another embodiment, ColorDiff and DepthDiff may be added and compared to a single threshold such that if the sum is less than the threshold the feature point is accepted and, if not, the feature point is rejected.

Based on the filtered feature points, feature point update module 124 may update the feature points for the current frame. For example, the feature points for the current frame may be the feature points generated by motion tracking module 122 minus the feature points filtered out by motion filtering module 123. The number of feature points for the current frame may then be compared to a threshold. If the number of feature points for the current frame exceeds (or meets or exceeds), the feature points for the current frame may be used and processing may be continued as is discussed with respect to center estimation module 125 herein.

If the number of feature points for the current frame (e.g., frame $F_t$) does not meet (or does not exceed) the threshold, re-initialization of the region of interest may be performed. Such re-initialization may be required for example, when the object or person represented by the region of interest changes or moves quickly (e.g., the object or person rotates, moves fast across the scene, or the like). For example, tracking module 102 may provide estimated center for a particular frame 151 including the estimated center for the previous frame (e.g., frame F center$_{t-1}$) to initialization module 101 and initialization module 101 may generate a region of interest, extract feature points, and estimate a center for the previous frame (e.g., frame $F_{t-1}$). For example, the number of feature points for the current frame (e.g., frame $F_t$) not meeting the threshold may indicate the region of interest is not tracking and needs to be re-initialized at the previous frame (e.g., frame $F_{t-1}$). Processing may then continue for the current frame based on region of interest 141, feature points 142, and/or effective center 143 determined for the previous frame as discussed above. For example, feature point analysis module 121 may generate a distance array, an angle array, and an offset vector based on feature points 142, motion tracking module 122 may perform motion tracking, motion filtering module 123 may perform motion filtering, and feature point update module 124 may update the feature points for the current frame (e.g., frame $F_t$) as discussed. If the number of feature points is yet again less than the threshold, region of interest tracking may have failed and system 100 may provide a region of interest tracking fail signal (not shown) and/or region of interest tracking may continue with the feature points available in an attempt to re-establish the region of interest.

If the number of feature points for the current frame (e.g., frame $F_t$) does meet (or exceeds) the threshold (e.g., tracking is successful with or without the discussed re-initialization of the previous frame), center estimation module 125 may generate an estimated or effective center for the region of interest for the current frame (e.g., frame $F_t$). Center estimation module 125 may generate an estimated or effective center for the region of interest for the current frame (e.g., center$_t$) using any suitable technique or techniques. In an embodiment, center estimation module 125 may generate an estimated or effective center for the region of interest for the current frame as an average of the positions of the feature points for the current frame as discussed with respect to Equation (1).

In another embodiment, center estimation module 125 may generate an estimated or effective center for the region of interest for the current frame that takes into account scale and rotation changes of the object or person or the like represented by the region of interest. For example, assuming there are M' accepted (e.g., non-filtered) feature points corresponding to the region of interest in the current frame, center estimation module 125 or feature point analysis module 121 may generate an M'×(M'−1)/2 dimensional distance array and angle array, which may be characterized as Dist[M'×(M'−1)/2] and Angle[M'×(M'−1)/2], respectively.

The distance array and angle array for the feature points of the current frame may then be compared with the distance array and angle array for the feature points of the initial frame such as, for example, OrigDist[M×(M−1)/2] and OrigAngle[M×(M−1)/2] as discussed with respect to an initialized frame (although the distance array and angle array of any reinitialized frame may be used) to generate scale and rotation changes with respect to the tracked region of interest between the initial or re-initialized frame and the current frame. The scale and rotation changes may be generated using any suitable technique or techniques. In an embodiment, determining the scale change may include determining a scaling factor as a median of ratios of pairwise distances between feature points corresponding to the tracked region of interest for the current frame and pairwise distances between feature points corresponding to the tracked region of interest for the initial or re-initialized frame. In an embodiment, determining the rotation change may include determining a rotation factor as a median of differences of pairwise angles between feature points corresponding to the tracked region of interest for the current frame and pairwise angles between feature points corresponding to the tracked region of interest for the previous frame. For example, the scaling and rotation factors may be determined as shown in Equations (4) and (5):

$$\text{Scale} = \text{median}\left(\frac{Dist[i]}{OrigDist[i]}\right) \quad (4)$$

$$Rot = \text{median}(Angle[i] - OrigAngle[i]) \quad (5)$$

where Scale may be the scaling factor, Rot may be the rotation factor, median may be an operator to provide the median of the argument provided, i may be a counter variable, Dist may be a distance array for the current frame, OrigDist may be a distance array for the previous frame, Angle may be an angle array for the current frame, and OrigAngle may be an angle array for the previous frame.

Center estimation module 125 or feature point analysis module 121 may then cluster feature points for the tracked region of the current frames based on their distance (e.g., Euclidean distance) to the center of the region of interest for the initialized or re-initialized frame after factoring in the scale and rotation change. For example, the scale and rotation adjusted location of each feature point may be provided as shown in Equation (6):

$$\text{center}(points[i]) = points[i] - \text{Scale} \times \text{Rotate}(OrigOffset[i], Rot) \quad (6)$$

where center may be an approximated center as determined based on a particular feature point (e.g. a per feature point approximation of the center of the region of interest), points may be the feature points for the current frame, i may be a counter variable, Scale may be the scaling factor, Rotate may be an operator to provide a rotation based on the argument provided, OrigOffset may be an offset vector as discussed, and Rot may be the rotation factor.

Based on the approximated center determined based on each feature point, the feature points may be clustered and the feature points in the majority cluster (e.g., the cluster having the most feature points) may then be used to determine the effective center for the current frame. The feature points may be clustered using any suitable technique or techniques. The center of the region of interest for the current frame may then be determined as the average of the approximated center as determined based on each particular feature point in the majority cluster each offset by the scale and rotation adjusted offset. For example, the center of the region of interest for the current frame may be the average of difference between each feature point and the scale and rotation adjusted original offset for the feature point. In an embodiment, the center of the region of interest for the current frame may be determined as shown in Equation (7):

$$\text{center}_t = \frac{1}{M''} \sum_{i=1 \ldots M''} [points[i] - \text{Scale} \times \text{Rotate}(OrigOffset[i], Rot)] \quad (7)$$

where $\text{center}_t$ may be the estimated or effective center of the region of interest for the current frame (e.g., frame $F_t$), M'' may be the number of feature points in the majority cluster, i may be a counter variable, points may be the feature points for the current frame, Scale may be the scaling factor, Rotate may be an operator to provide a rotation based on the argument provided, OrigOffset may be an offset vector, and Rot may be the rotation factor.

Center evaluation module 126 may receive the center of the tracked region of interest for the current frame (e.g., $\text{center}_t$) and the center of the tracked region of interest for the previous frame (e.g., $\text{center}_{t-1}$) and center evaluation module 126 may accept or reject the center of the tracked region of interest for the current frame. Center evaluation module 126 may accept or reject the center of the tracked region of interest for the current frame using any suitable technique or techniques. In an embodiment, center evaluation module 126 may accept or reject the center of the tracked region of interest for the current frame based on a comparison of a depth value corresponding to the effective center of the tracked region of interest for the current frame (e.g., depth at $\text{center}_t$) to a depth value corresponding to the effective center of the tracked region of interest for the previous frame (e.g., depth at $\text{center}_{t-1}$). If the difference between the depth value corresponding to the effective center of the tracked region of interest for the current frame (e.g., depth at $\text{center}_t$) and the depth value corresponding to the effective center of the tracked region of interest for the previous frame does not exceed a threshold, the effective center of the tracked region of interest for the current frame may be accepted and provided as region of interest center 161 and processing may continue at a next frame of RGB-D video 131 (e.g., frame $F_{t+1}$) as discussed above. For example, motion tracking, motion filtering, feature point updating, center estimation, and center evaluation may be performed for the next frame as discussed.

If the difference between the depth value corresponding to the effective center of the tracked region of interest for the current frame (e.g., depth at $\text{center}_t$) and the depth value corresponding to the effective center of the tracked region of interest for the previous frame exceeds the threshold, re-initialization of the region of interest may be performed. Such re-initialization may be required in the context of a large disparity between the new and old effective centers when the new effective center is incorrect. For example, tracking module 102 may provide estimated center for a particular frame 151 including the estimated center for the previous frame (e.g., frame $F_{t-1}$; $\text{center}_{t-1}$) to initialization module 101 and initialization module 101 may generate a region of interest, extract feature points, and estimate a center for the previous frame (e.g., frame $F_{t-1}$) as a re-initialization of the previous frame. Processing may then continue for the current frame based on region of interest 141, feature points 142, and/or effective center 143 as discussed above.

For example, feature point analysis module 121 may generate a distance array, an angle array, and an offset vector based on feature points 142, motion tracking module 122 may perform motion tracking, motion filtering module 123 may perform motion filtering, feature point update module 124 may update the feature points for the current frame (e.g., frame $F_t$), center estimation module 125 may estimate a center of the tracked region of interest for the current frame, and center evaluation module 126 may compare the difference between the depth at the center of the region of interest for the previous frame (e.g., depth at $\text{center}_{t-1}$) and the depth at the center of the region of interest for the current frame (e.g., depth at $\text{center}_t$). If the difference yet again exceeds the threshold, region of interest tracking may have failed and system 100 may provide a region of interest tracking fail signal (not shown) and/or region of interest tracking may continue with the center of the region of interest available in an attempt to re-establish the region of interest.

Using such techniques, system 100 may track a region of interest across frames. Such techniques may provide robust region of interest tracking without requiring any prior training or domain knowledge and may provide tracking on unseen video directly. The region of interest tracking techniques discussed herein may begin tracking with a single region of interest selection and may recover from lost tracking (e.g., lost during motion tracking or the like) without requiring user intervention.

Figure 4:
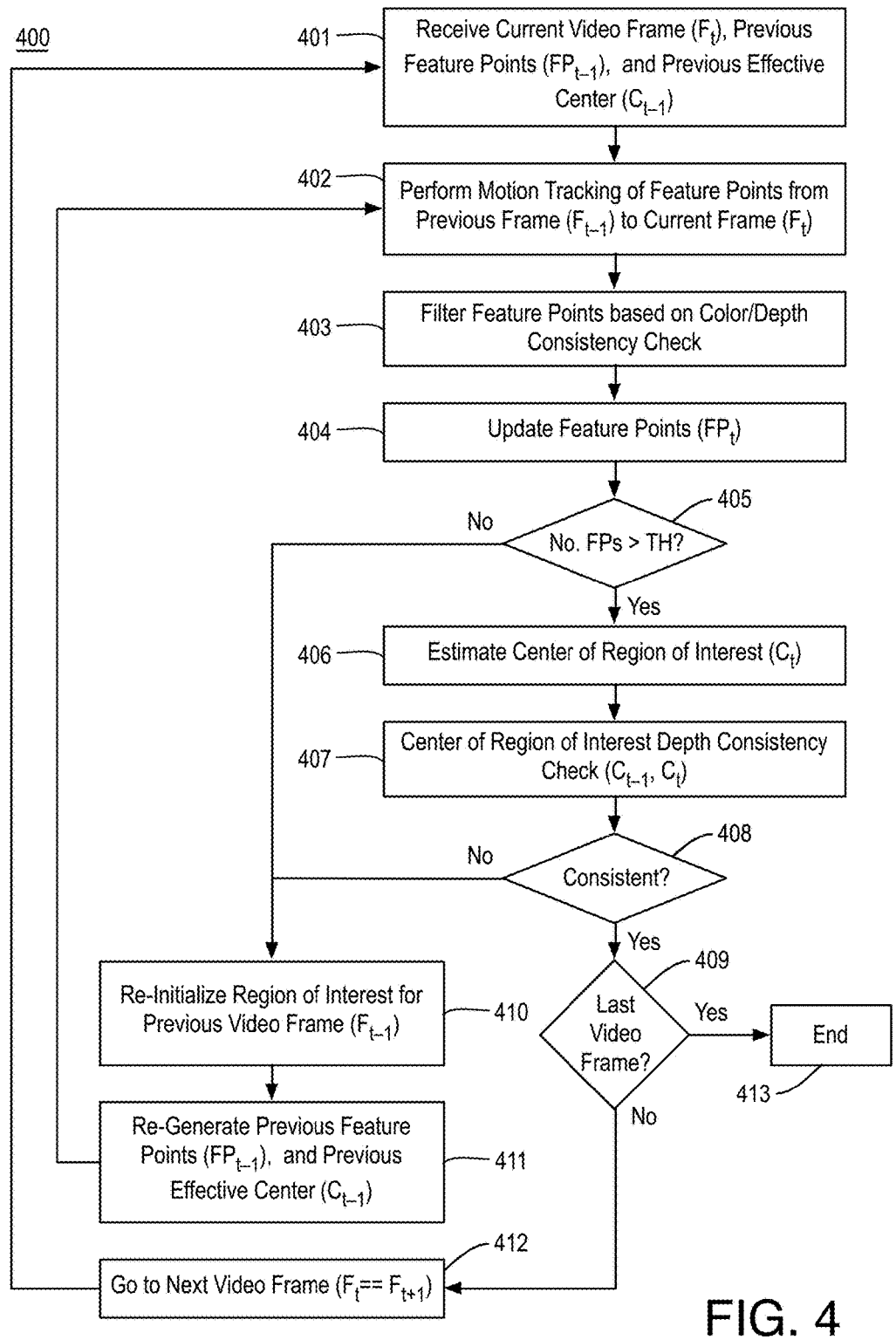
FIG. 4 illustrates an example process for tracking a region of interest across video frames.

FIG. 4 illustrates an example process 400 for tracking a region of interest across video frames, arranged in accordance with at least some implementations of the present disclosure. Process 400 may include one or more operations 401-413 as illustrated in FIG. 4. Process 400 or portions thereof may be performed by a device or system (e.g., system 100 or any other device or system discussed herein) to track a region of interest across video frames. Process 400 or portions thereof may be repeated for any number regions of interest, video frames, sequences of video frames, or the like. Furthermore, process 400 will be discussed with reference to FIGS. 5 and 6.

Figure 5:
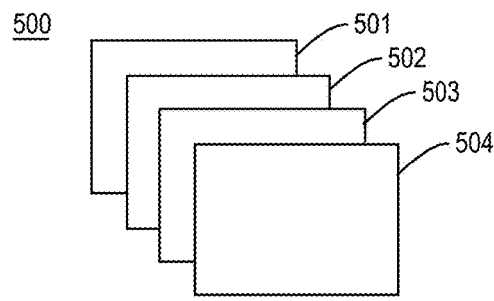
FIG. 5 illustrates an example video sequence of video frames.

FIG. 5 illustrates an example video sequence 500 of video frames 501-504, arranged in accordance with at least some implementations of the present disclosure. Video frames 501-504 may include any suitable video frames having luma and/or chroma information for pixels thereof and corresponding depth values for pixels thereof. The resolution of the luma and/or chroma information and the depth information may be the same or they may be different. Furthermore, video frames 501-504 may be provided in an order such that video frame 501 is first, video frame 502 is second, video frame 503 is third, video frame 504 is fourth, and so on. Video sequence 500 is illustrated with four video frames 501-504 for the sake of clarity of presentation. However, video sequence 500 may include any number of video frames.

Figure 6:
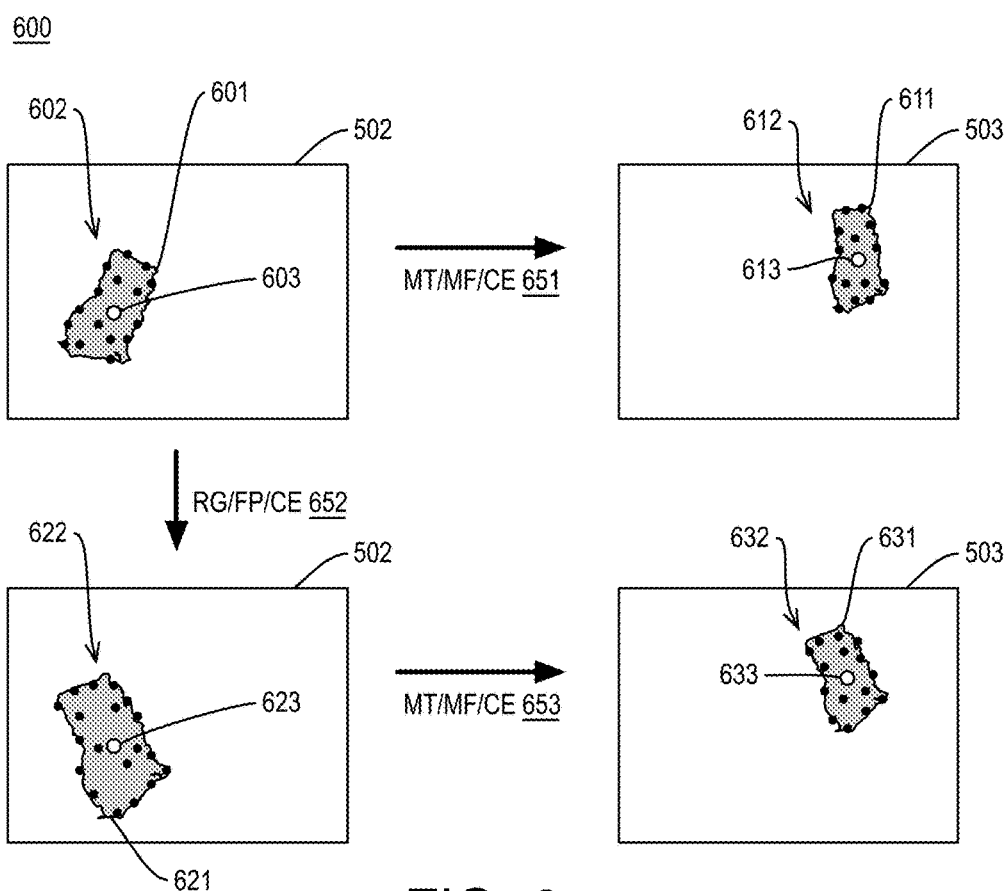
FIG. 6 illustrates example tracking of a region of interest across video frames.

FIG. 6 illustrates example tracking 600 of a region of interest across video frames, arranged in accordance with at least some implementations of the present disclosure. As shown, regions of interest may be tracked across video frames 502 and 503 as is discussed further herein such that video frame 503 is subsequent to prior video frame 502.

Returning to FIG. 4, as shown, process 400 may begin at operation 401, where a current video frame ($F_t$), previous feature points ($FP_{t-1}$), and a previous effective center ($C_{t-1}$) for a tracked region of interest may be received. For example, the current video frame may be provided via a video stream such as video sequence 500 or the like. The previous feature points and the previous effective center may be received from an initialization module or operation as discussed with respect to initialization module 101 and process 300 or they may be received based on processing a previous video frame as discussed further herein.

For example, with reference to FIG. 6, video frame 503, feature points 602, and effective center 603 may be received at operation 401. In some examples, video frame 502 may correspond to an initialization frame or re-initialization frame as discussed herein. In such examples, a region of interest indicator (not shown) may be received from a user, an object recognition module, or the like as discussed with respect to region of interest signal 132 or an effective center for the previous frame may be received. In such examples, region of interest 601 may be generated based on a region growth operation, feature points 602 may be extracted, and effective center 603 may be estimated as discussed with respect to process 300 and elsewhere herein. In other examples, feature points 602 and effective center 603 may have been generated during tracking as is discussed further herein. As will be appreciated, in such examples, region of interest 601 may appear in video frame 502 but region of interest 601 may not be specifically determined.

Returning to FIG. 4, processing may continue at operation 402, where motion tracking of feature points may be performed from the previous frame ($F_{t-1}$) to the current frame ($F_t$). Motion tracking of the feature points received at operation 401 may be performed using any suitable technique or techniques. For example, motion tracking of the feature points may be performed using optical flow techniques or the like.

Processing may continue at operation 403, where the tracked feature points in the current frame ($F_t$) may be filtered. The tracked feature points may be filtered using any suitable technique or techniques. In an embodiment, the tracked feature points may be filtered by checking the color and/or depth consistency between corresponding feature points between the previous frame ($F_{t-1}$) and the current frame ($F_t$). For example, for each pair of corresponding feature points between the frames, a color difference between a window around a particular feature point in the previous frame and a window around the corresponding feature point in the current frame and/or a depth difference between a window around the particular feature point in the previous frame and a window around the corresponding feature point in the current frame may be determined. The color and/or depth differences may be compared to a threshold and, if both are less than (e.g., do not exceed) their respective thresholds, the feature point for the current frame may be accepted and, if either exceeds its respective threshold, the feature point for the current frame may be rejected.

Processing may continue at operation 404, where the feature points may be updated for the current frame. The feature points may be updated for the current frame may be updated using any suitable technique or techniques. In an embodiment, updating the feature points may include assigning the feature points accepted at operation 403 to the current frame ($F_t$).

Processing may continue at decision operation 405, where a determination may be made as to whether the number of feature points of the current frame exceeds a threshold (or meets a threshold in other examples). The threshold implemented at decision operation 405 may include any suitable value such as 100 or the like.

As shown, if the number of feature points of the current frame does not exceed the threshold (or meet the threshold in other examples), processing may continue at operation 410, where the region of interest may be re-initialized for the previous video frame ($F_{t-1}$). Such re-initialization may be performed using any suitable technique or techniques. For example, a region grow operation may be performed based on the previous effective center ($C_{t-1}$) as discussed herein with respect to operation 302 of process 300.

Processing may continue at operation 411, where feature points and an effective center for the region of interest in the previous frame may be re-generated. The feature points and the effective center for the previous frame may be generated using any suitable technique or techniques. For example, feature extraction may be performed to re-generate the feature points for the region of interest for the previous frame ($FP_{t-1}$) as discussed with respect to operation 303 and decision operation 304 of process 300 and an effective center for the region of interest of the previous frame ($C_{t-1}$) may be determined based on the re-generated feature points for the previous frame as discussed with respect to operation 305 of process 300.

Furthermore, processing may continue from operation 411 at operation 402, where processing may continue as discussed above with motion tracking, feature point filtering, and updating of feature points being repeated for the current frame ($F_t$) based on the re-initialization of the previous frame ($F_{t-1}$). If the number of feature points at decision operation 405 is again less than the threshold, processing may end with a region of interest tracking error (not shown).

Returning to decision operation 405, if the number of feature points of the current frame does exceed the threshold (or meets the threshold in other examples), whether from a previous frame that was initialized, re-initialized, or tracked, processing may continue at operation 406, where an effective center of the region of interest for the current frame ($C_t$) may be determined. The effective center of the region of interest for the current frame may be determined using any suitable technique or techniques. For example, a selected subset of the feature points determined at operation 404 may be determined by clustering the feature points based on a difference between each feature point and a scale and rotation adjusted offset between a corresponding feature point in the previous frame and the effective center of the tracked region of interest for the previous frame to generate clusters and selecting the selected subset of feature points as a cluster multiple clusters having the most feature points. The effective center of the region of interest for the current frame may then be determined as an average of differences between each feature point and a scale and rotation adjusted offset between a corresponding feature point in a previous frame (e.g., a previously initialized frame or any previous frame) and the effective center of the tracked region of interest for the previous frame. Such techniques may include the techniques discussed with respect to Equations (4)-(7) and elsewhere herein.

Processing may continue at operation 407, where a depth consistency check may be performed based on the effective center of the region of interest for the current frame ($C_t$) and the effective center of the region of interest for the previous frame ($C_{t-1}$). The depth consistency check may be performed using any suitable technique or techniques. For example, the depth consistency check may be based on a comparison of a depth value corresponding to the effective center of the tracked region of interest for the current frame (depth of $C_t$) to a depth value corresponding to the effective center of the tracked region of interest for the previous frame (depth of $C_{t-1}$). For example, if the difference is less than a threshold, the depth constancy check may pass and the effective center of the tracked region of interest for the current frame ($C_t$) may be output and if the difference exceeds the threshold, the depth constancy check may fail.

As shown, if the depth constancy check passes, processing may continue at decision operation 409, where a determination may be made as to whether the current frame is the last video frame to be processed. If so, process 400 may end at operation 413. If not, processing may continue at operation 412, where process 400 may proceed to a next video frame ($F_{t+1}$) and processing may continue at operation 401 as discussed herein.

If the depth constancy check fails, processing may continue at operation 410, where the region of interest may be re-initialized for the previous video frame ($F_{t-1}$). Such re-initialization may be performed using any suitable technique or techniques such as based on a region grow operation using the previous effective center ($C_{t-1}$) as a seed as discussed herein with respect to operation 302 of process 300. As discussed above, processing may continue at operation 411, where feature points and an effective center for the region of interest in the previous frame may be re-generated, at operation 402, where processing may continue as discussed with motion tracking, feature point filtering, updating of feature points, feature point number validation, center of region of interest estimation, and a center of region of interest consistency being repeated for the current frame ($F_t$) based on the re-initialization of the previous frame ($F_{t-1}$). If the center of region of interest consistency check again fails, processing may end with a region of interest tracking error (not shown).

With returning reference to FIG. 6, as discussed, video frame 503, feature points 602, and effective center 603 may be received at operation 401. Furthermore, operations 402-408 may be performed as indicated by motion tracking/motion filtering/center estimation (MT/MF/CE) arrow 651 to generate feature points 612 and effective center 613 corresponding to video frame 503 (e.g., a current video frame). In the illustration of FIG. 6, region of interest 611 is shown for clarity of presentation. As will be appreciated, region of interest 611 may appear in video frame 503, but region of interest 611 may not be specifically approximated or determined using the techniques discussed herein. As shown, the region of interest may have moved, scaled (becoming smaller in the illustrated example), and/or rotated between video frame 502 and video frame 503. Such motion, scaling, and/or rotation may be exaggerated in FIG. 6 for the sake of clarity of presentation.

Furthermore, as discussed, if either the number of feature points is less than a threshold (e.g., as determined at decision operation 405) or the depth of the center of the region of interest changes too drastically (e.g., as determined at decision operation 408), re-initialization may be performed. For example, if either occur, operations 410 and 411 may be performed as indicated by region of interest generation/feature point extraction/center estimation (RG/FP/CE) arrow 652 to generate, region of interest 621, feature points 622, and effective center 623 corresponding to video frame 502 (e.g., a previous video frame). Such re-initialization or re-tracking may be required due to fast object motion, a change in the shape or illumination of the object, or the like as discussed herein. For example, re-initialization in the previous frame may provide a more accurate representation of the region of interest for video frame 502 (e.g., a previous video frame).

As shown, if, based on the re-initialization, the number of feature points now exceeds the threshold (e.g., as determined at decision operation 405) and the depth of the center of the region of interest is consistent (e.g., as determined at decision operation 408), operations 402-408 may be performed as indicated by motion tracking/motion filtering/center estimation (MT/MF/CE) arrow 653 to generate feature points 632 and effective center 633 corresponding to video frame 503 (e.g., a current video frame). As discussed with respect to region of interest 611, region of interest 631 may appear in video frame 503, but region of interest 631 may not be specifically approximated or determined. As discussed with respect to FIG. 4 and elsewhere herein, such tracking processing with re-initialization as needed may be repeated for subsequent video frames to track a region of interest across the video frames. Such techniques may provide for robust region of interest tracking across video frames despite changes in the region of interest and/or camera pose and/or changes in global or local.

Figure 7:
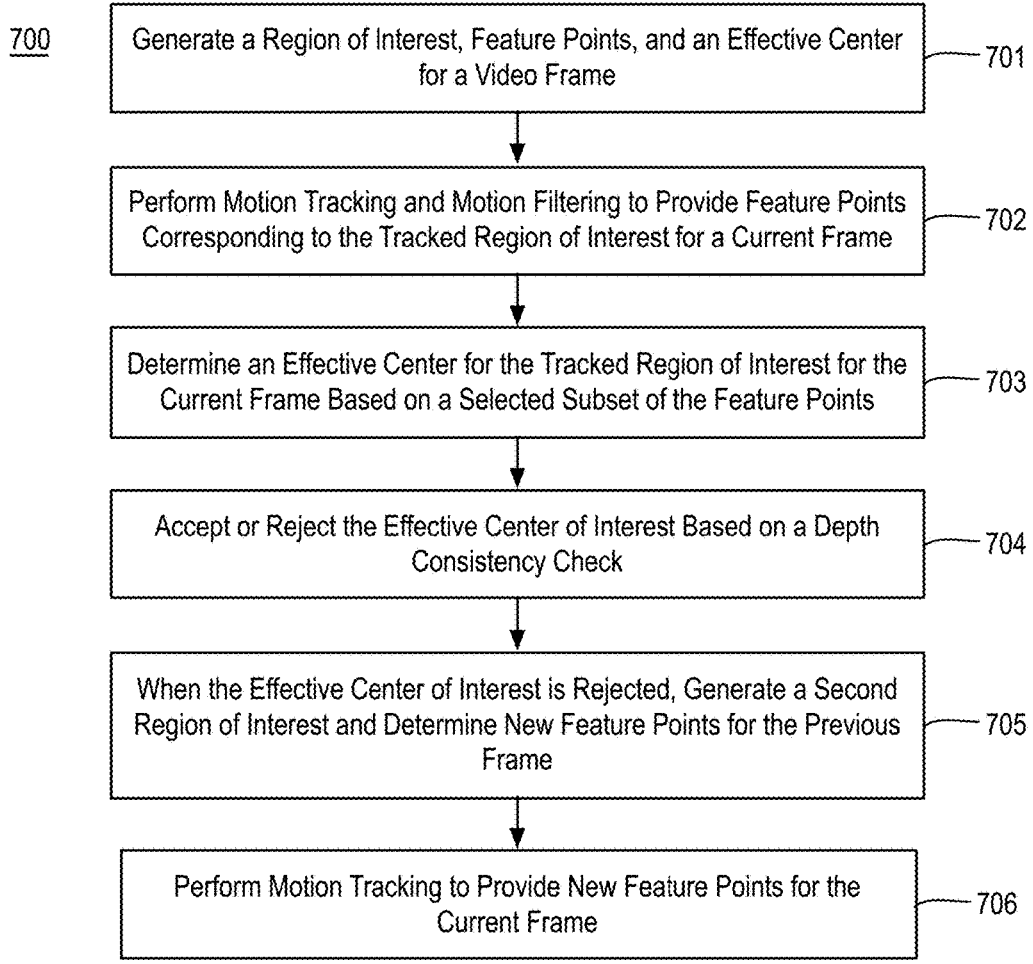
FIG. 7 is a flow diagram illustrating an example process for providing region of interest tracking across video frames.

FIG. 7 is a flow diagram illustrating an example process 700 for providing region of interest tracking across video frames, arranged in accordance with at least some implementations of the present disclosure. Process 700 may include one or more operations 701-706 as illustrated in FIG. 7. Process 700 may form at least part of a region of interest tracking technique. By way of non-limiting example, process 700 may form at least part of a region of interest tracking technique performed by system 100 as discussed herein. Furthermore, process 700 will be described herein with reference to system 800 of FIG. 8.

Figure 8:
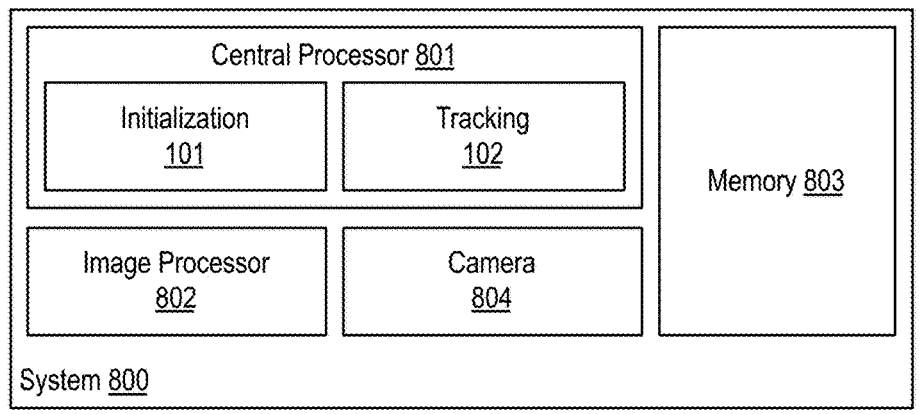
FIG. 8 is an illustrative diagram of an example system for providing region of interest tracking across video frames.

FIG. 8 is an illustrative diagram of an example system 800 for providing region of interest tracking across video frames, arranged in accordance with at least some implementations of the present disclosure. As shown in FIG. 8, system 800 may include a central processor 801, an image processor 802, a memory 803, and a camera 804. Also as shown, central processor 801 may include or implement initialization module 101 and tracking module 102.

Such components or modules may be implemented to perform operations as discussed herein. For example, initialization module 101 may generate a region of interest (as discussed with respect to region generation module 111), perform feature extraction to generate feature points (as discussed with respect to feature extraction module 112), and determine an effective center of a region of interest (as discussed with respect to center estimation module 113). Furthermore, tracking module 102 may perform feature point analysis to generate pairwise depth arrays, pairwise angle arrays, and/or offset vectors (as discussed with respect to feature point analysis module 121), perform motion tracking (as discussed with respect to motion tracking module 122), perform motion filtering to filter tracked feature points (as discussed with respect to motion filtering module 123), update feature points (as discussed with respect to feature point update module 124), estimate effective centers of regions of interest based on clustered feature points and/or scale and rotation adjustments (as discussed with respect to center estimation module 125), and evaluate the effective centers based on depth consistency (as discussed with respect to center evaluation module 126). Memory 803 may store video frames, disparity maps, region of interest data, feature points, subsets of feature points, depth arrays, angle arrays, offset vectors, estimated centers, motion tracking data, thresholds, user input information, or any other data discussed herein.

As shown, in some examples, initialization module 101 and tracking module 102 may be implemented via central processor 901. In other examples, one or both or portions of initialization module 101 and tracking module 102 may be implemented via image processor 801, a video processor, a graphics processor, or the like. In yet other examples, one or both or portions of initialization module 101 and tracking module 102 may be implemented via an image or video processing pipeline or unit.

Image processor 802 may include any number and type of graphics, image, or video processing units that may provide the operations as discussed herein. In some examples, image processor 802 may be an image signal processor. Such operations may be implemented via software or hardware or a combination thereof. For example, image processor 802 may include circuitry dedicated to manipulate frame data, image data, or video data obtained from memory 803. Central processor 801 may include any number and type of processing units or modules that may provide control and other high level functions for system 800 and/or provide any operations as discussed herein. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 803 may be implemented by cache memory.

In an embodiment, one or both or portions of initialization module 101 and tracking module 102 may be implemented via an execution unit (EU) of image processor 802. The EU may include, for example, programmable logic or circuitry such as a logic core or cores that may provide a wide array of programmable logic functions. In an embodiment, one or both or portions of initialization module 101 and tracking module 102 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or both or portions of initialization module 101 and tracking module 102 may be implemented via an application specific integrated circuit (ASIC). The ASIC may include an integrated circuitry customized to perform the operations discussed herein.

Camera 804 may include any camera having any suitable number of lenses or the like for capturing video having corresponding depth data. Camera 804 may be implemented as a camera array, light field camera, plenoptic camera, or the like. In an embodiment, camera 804 may implement all or portions of device 200.

Returning to discussion of FIG. 7, process 700 may begin at operation 701, where a region of interest, feature points, and an effective center of the region of interest may be generated. The region of interest, feature points, and effective center of the region of interest may be generated using any suitable technique or techniques. In an embodiment, initialization module 101 as implemented via central processor 801 may generate the region of interest, feature points, and effective center of the region of interest. In an embodiment, a region of interest indicator corresponding to a frame may be received from a user (e.g., by a use selection) or another component (e.g., an object recognition component or the like) and the tracked region of interest for the frame may be generated based on the region of interest indicator and a region grow operation. In an embodiment, a previously determined center for the region of interest may be provided and the tracked region of interest for the frame may be generated based on the previously determined center and a region grow operation. In an embodiment, sparse feature points may be extracted based on the tracked region of interest for the frame and feature point extraction parameters. In an embodiment, when a number of the sparse extracted feature points is less than a threshold, additional or alternative sparse feature points may be extracted based on the tracked region of interest for the frame and different feature point extraction parameters. In an embodiment, the effective center of the region of interest may be determined as an average of the extracted sparse feature points. As discussed herein, process 700 may be performed based on video frames having corresponding depth maps or depth data. For example, process 700 may be performed using red, green, blue, depth (RGB-D) video frames such that the depth includes disparity values or depth distance values.

Processing may continue at operation 702, where motion tracking of the feature points of the video frame may be performed to provide feature points corresponding to the tracked region of interest for a frame subsequent to the video frame (e.g., a current frame) and the tracked feature points for the current frame may be filtered to provide filtered feature points corresponding to the tracked region of interest for the current frame. In an embodiment, tracking module 102 as implemented by central processor 801 may perform the motion tracking and feature point filtering. In an embodiment, filtering the tracked feature points may include determining a color difference between a window around a particular feature point of the feature points for the current frame and a window around a corresponding feature point of feature points of the previous frame and a depth difference between a window around the particular feature point of the feature points for the current frame and a window around the corresponding feature point of the feature points for the previous frame. For example, a feature point may be rejected when either the color difference exceeds a first threshold or the depth difference exceeds a second threshold. As discussed, when the number of feature points for the current frame is less than a threshold, operations 701 and 702 may be repeated based on a center of the region of interest for the previous frame.

Processing may continue at operation 703, where an effective center may be determined for the tracked region of interest for the current frame based on a selected subset of the feature points. The effective may be determined using any suitable technique or techniques. In an embodiment, tracking module 102 as implemented via central processor 801 may determine the effective center. In an embodiment, the selected subset of the feature points may be determined by clustering the feature points based on a difference between each feature point and a scale and rotation adjusted offset between a corresponding feature point in the initial or re-initialized frame and the effective center of the tracked region of interest for the initial or re-initialized frame to generate a plurality of clusters and selecting the selected subset of feature points as a cluster of the plurality of clusters having the most feature points. In an embodiment, the scale and rotation adjustments are based on a scaling factor and a rotation factor. In an embodiment, the scaling factor may be determined as a median of ratios of pairwise distances between the feature points corresponding to the tracked region of interest for the current frame and pairwise distances between feature points corresponding to the tracked region of interest for the initial or re-initialized frame. In an embodiment, the rotation factor may be determined as a median of differences of pairwise angles between the feature points corresponding to the tracked region of interest for the current frame and pairwise angles between the feature points corresponding to the tracked region of interest for the initial or re-initialized frame. In an embodiment, determining the effective center of the tracked region of interest for the current frame may include providing the effective center as an average of differences between each feature point and a scale and rotation adjusted offset between a corresponding feature point in the initial or re-initialized frame and the effective center of the tracked region of interest for the initial or re-initialized frame.

Processing may continue at operation 704, where the effective center of interest for the current frame may be accepted or rejected based on a depth consistency check. The depth consistency check may be performed to accept or reject the effective center using any suitable technique or techniques. In an embodiment, tracking module 102 as implemented via central processor 801 may perform the depth consistency check. In an embodiment, the effective center of the tracked region of interest may be accepted or rejected based on a comparison of a depth value corresponding to the effective center of the tracked region of interest for the current frame to a depth value corresponding to an effective center of the tracked region of interest for a previous frame. For example, if the difference is less than a threshold, the effective center of interest for the current frame may be accepted and, if the difference is greater than a threshold, the effective center of interest for the current frame may be rejected.

Processing may continue at operation 705, where, when the effective center of the tracked region of interest for the current frame is rejected, a second tracked region of interest may be generated for the previous frame based on the effective center of the tracked region of interest for the previous frame and second feature points corresponding to the second region of interest may be determined for the previous frame. The second region of interest and second feature points for the previous frame may be generated using any suitable technique or techniques. In an embodiment, tracking module 102 as implemented via central processor 801 may generate the second region of interest and second feature points for the previous frame.

Processing may continue at operation 706, where motion tracking of the second feature points may be performed to provide feature points corresponding to the second tracked region of interest for the current frame. The motion tracking may be performed using any suitable technique or techniques. In an embodiment, module 102 as implemented via central processor 801 may perform the motion tracking. In an embodiment, the new feature points may be filtered and the number of remaining feature points may be compared to a threshold as discussed herein. If the number of feature points are greater than the threshold, an effective center may be determined based on the new feature points for the current frame as discussed with respect to operation 703 and the new effective center may be accepted or rejected as discussed with respect to operation 704. If the new effective center is rejected, process 700 may stop as tracking has failed. If the new effective center is accepted, processing may continue at operations 702 and so on for a subsequent frame.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
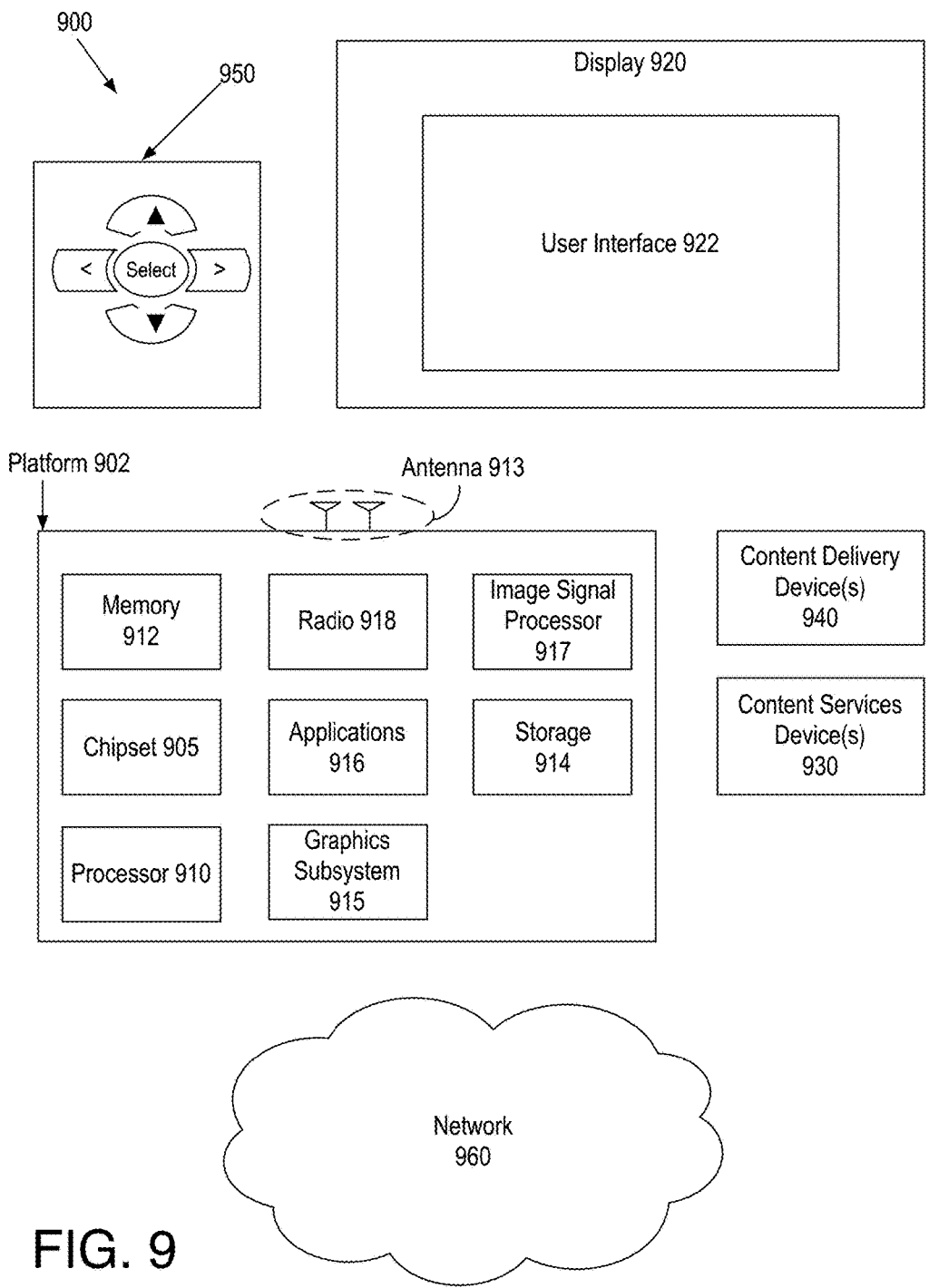
FIG. 9 is an illustrative diagram of an example system.

FIG. 9 is an illustrative diagram of an example system 900, arranged in accordance with at least some implementations of the present disclosure. In various implementations, system 900 may be a mobile system although system 900 is not limited to this context. System 900 may implement and/or perform any modules or techniques discussed herein. For example, system 900 may be incorporated into a personal computer (PC), sever, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 900 may be implemented via a cloud computing environment.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Image signal processor 917 may be implemented as a specialized digital signal processor or the like used for image or video frame processing. In some examples, image signal processor 917 may be implemented based on a single instruction multiple data or multiple instruction multiple data architecture or the like. In some examples, image signal processor 917 may be characterized as a media processor. As discussed herein, image signal processor 917 may be implemented based on a system on a chip architecture and/or based on a multi-core architecture.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of navigation controller 950 may be used to interact with user interface 922, for example. In various embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various embodiments, navigation controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
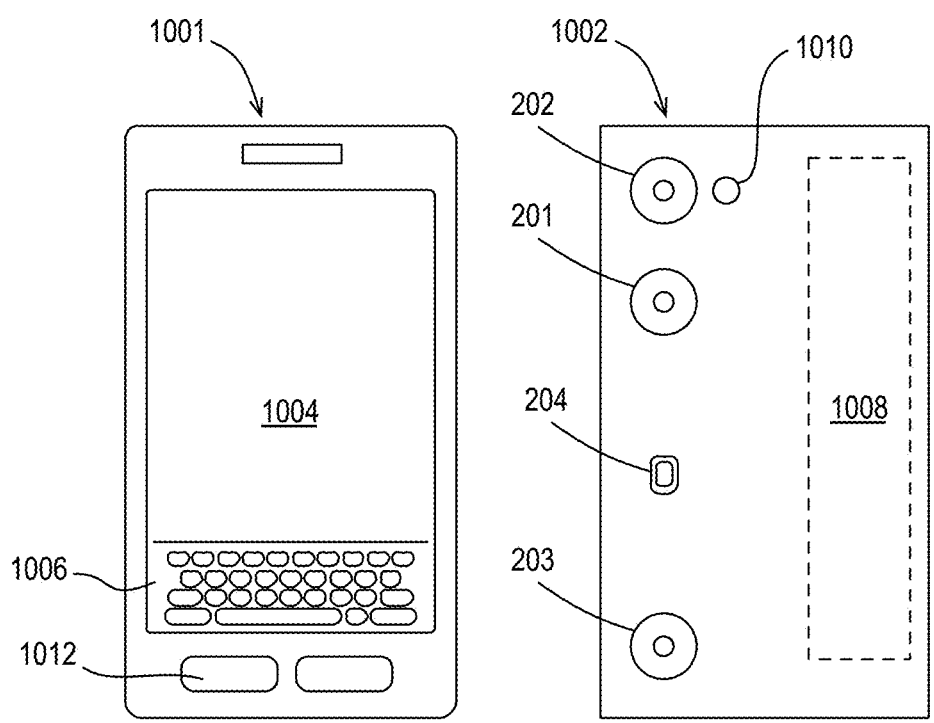
FIG. 10 illustrates an example small form factor device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, other systems discussed herein or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, color camera 202, infrared camera 201, infrared camera 203, infrared transmitter 204, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include color camera 202 and a flash 1010 integrated into back 1002 (or elsewhere) of device 1000. In other examples, color camera 202 and flash 1010 may be integrated into front 1001 of device 1000 or both front and back cameras may be provided. Color camera 202 and flash 1010 may be components of a camera module to originate color image data processed into streaming video that is output to display 1004 and/or communicated remotely from device 1000 via antenna 1008 for example. Furthermore, infrared camera 201, infrared camera 203, and infrared transmitter 204 may originate IR image data to be processed to generate depth images as discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for providing region of interest tracking across video frames having corresponding depth data comprises determining an effective center of a tracked region of interest for a current frame of the video frames based on a selected subset of feature points corresponding to the tracked region of interest, accepting or rejecting the effective center of the tracked region of interest for the current frame based on a comparison of a depth value corresponding to the effective center of the tracked region of interest for the current frame to a second depth value corresponding to a second effective center of the tracked region of interest for a previous frame, and, when the effective center of the tracked region of interest for the current frame is rejected, generating a second tracked region of interest for the previous frame based on the second effective center of the tracked region of interest for the previous frame, determining second feature points corresponding to the second region of interest for the previous frame, and performing motion tracking of the second feature points to provide third feature points corresponding to the second tracked region of interest for the current frame.

Further to the first embodiments, the method further comprises determining the selected subset of the feature points corresponding to the tracked region of interest by clustering the feature points based on a difference between each feature point and a scale and rotation adjusted offset between a corresponding feature point in an initial or re-initialized frame and a third effective center of the tracked region of interest for the initial or re-initialized frame to generate a plurality of clusters and selecting the selected subset of feature points as a cluster of the plurality of clusters having the most feature points.

Further to the first embodiments, the method further comprises determining the selected subset of the feature points corresponding to the tracked region of interest by clustering the feature points based on a difference between each feature point and a scale and rotation adjusted offset between a corresponding feature point in an initial or re-initialized frame and a third effective center of the tracked region of interest for the initial or re-initialized frame to generate a plurality of clusters and selecting the selected subset of feature points as a cluster of the plurality of clusters having the most feature points, wherein the scale and rotation adjustments are based on a scaling factor and a rotation factor, the method further comprising determining the scaling factor as a median of ratios of pairwise distances between the feature points corresponding to the tracked region of interest for the current frame and pairwise distances between fourth feature points corresponding to the tracked region of interest for the initial or re-initialized frame and determining the rotation factor as a median of differences of pairwise angles between the feature points corresponding to the tracked region of interest for the current frame and pairwise angles between the fourth feature points corresponding to the tracked region of interest for the initial or re-initialized frame.

Further to the first embodiments, determining the effective center of the tracked region of interest for the current frame comprises providing the effective center as an average of differences between each feature point of the selected subset of feature points and a scale and rotation adjusted offset between a corresponding feature point in an initial or re-initialized frame and a third effective center of the tracked region of interest for the initial or re-initialized frame.

Further to the first embodiments, the method further comprises performing motion tracking of fourth feature points corresponding to the tracked region of interest for the previous frame to provide fifth feature points corresponding to the tracked region of interest for the current frame and filtering the fifth feature points corresponding to the tracked region of interest for the current frame to provide the feature points corresponding to the tracked region of interest for the current frame.

Further to the first embodiments, the method further comprises performing motion tracking of fourth feature points corresponding to the tracked region of interest for the previous frame to provide fifth feature points corresponding to the tracked region of interest for the current frame and filtering the fifth feature points corresponding to the tracked region of interest for the current frame to provide the feature points corresponding to the tracked region of interest for the current frame, wherein filtering the fifth feature points comprises determining a color difference between a window around a particular feature point of the fifth feature points and a second window around a corresponding feature point of the fourth feature points and a depth difference between a third window around the particular feature point of the fifth feature points and a fourth window around the corresponding feature point of the fourth feature points.

Further to the first embodiments, the method further comprises performing motion tracking of fourth feature points corresponding to the tracked region of interest for the previous frame to provide fifth feature points corresponding to the tracked region of interest for the current frame and filtering the fifth feature points corresponding to the tracked region of interest for the current frame to provide the feature points corresponding to the tracked region of interest for the current frame, wherein filtering the fifth feature points comprises determining a color difference between a window around a particular feature point of the fifth feature points and a second window around a corresponding feature point of the fourth feature points and a depth difference between a third window around the particular feature point of the fifth feature points and a fourth window around the corresponding feature point of the fourth feature points, and wherein the particular feature point is rejected when either the color difference exceeds a first threshold or the depth difference exceeds a second threshold.

Further to the first embodiments, the method further comprises, when the effective center of the tracked region of interest for the current frame is accepted, performing motion tracking of the feature points to provide fourth feature points corresponding to the tracked region of interest for a subsequent frame, filtering the fourth feature points corresponding to the tracked region of interest for the subsequent frame to provide fifth feature points corresponding to the tracked region of interest for the subsequent frame, and, when the number of fifth feature points is less than a threshold, generating a third region of interest for the current frame based on the effective center of the tracked region of interest for the current frame.

Further to the first embodiments, the method further comprises receiving a region of interest indicator corresponding to the previous frame and generating the tracked region of interest for the previous frame based on the region of interest indicator and a region grow operation.

Further to the first embodiments, the method further comprises receiving a region of interest indicator corresponding to the previous frame, generating the tracked region of interest for the previous frame based on the region of interest indicator and a region grow operation, extracting sparse feature points based on the tracked region of interest for the previous frame and first feature point extraction parameters, and, when a number of the sparse extracted feature points is less than a threshold, extracting second sparse feature points based on the tracked region of interest for the previous frame and second feature point extraction parameters, wherein the first and second feature point extraction parameters are different.

Further to the first embodiments, the method further comprises receiving a region of interest indicator corresponding to the previous frame, generating the tracked region of interest for the previous frame based on the region of interest indicator and a region grow operation, extracting sparse feature points based on the tracked region of interest for the previous frame, and determining the second effective center of the tracked region of interest for the previous frame as an average of the sparse feature points.

Further to the first embodiments, the video frames comprise red, green, blue, depth (RGB-D) video frames and the depth comprises at least one of disparity values or depth distance values.

In one or more second embodiments, a system for providing region of interest tracking across video frames comprises a memory configured to store the video frames and a processor coupled to the memory, the processor to determine an effective center of a tracked region of interest for a current frame of the video frames based on a selected subset of feature points corresponding to the tracked region of interest, to accept or reject the effective center of the tracked region of interest for the current frame based on a comparison of a depth value corresponding to the effective center of the tracked region of interest for the current frame to a second depth value corresponding to a second effective center of the tracked region of interest for a previous frame, and, when the effective center of the tracked region of interest for the current frame is rejected, to generate a second tracked region of interest for the previous frame based on the second effective center of the tracked region of interest for the previous frame, to determine second feature points corresponding to the second region of interest for the previous frame, and to perform motion tracking of the second feature points to provide third feature points corresponding to the second tracked region of interest for the current frame.

Further to the second embodiments, the processor is further to determine the selected subset of the feature points corresponding to the tracked region of interest, wherein to determine the selected subset of the feature points, the processor is to cluster the feature points based on a difference between each feature point and a scale and rotation adjusted offset between a corresponding feature point in an initial or re-initialized frame and a third effective center of the tracked region of interest for the initial or re-initialized frame to generate a plurality of clusters and to select the selected subset of feature points as a cluster of the plurality of clusters having the most feature points.

Further to the second embodiments, the processor is further to determine the selected subset of the feature points corresponding to the tracked region of interest, wherein to determine the selected subset of the feature points, the processor is to cluster the feature points based on a difference between each feature point and a scale and rotation adjusted offset between a corresponding feature point in an initial or re-initialized frame and a third effective center of the tracked region of interest for the initial or re-initialized frame to generate a plurality of clusters and to select the selected subset of feature points as a cluster of the plurality of clusters having the most feature points, wherein the scale and rotation adjustments are based on a scaling factor and a rotation factor, the processor further to determine the scaling factor as a median of ratios of pairwise distances between the feature points corresponding to the tracked region of interest for the current frame and pairwise distances between fourth feature points corresponding to the tracked region of interest for the initial or re-initialized frame and to determine the rotation factor as a median of differences of pairwise angles between the feature points corresponding to the tracked region of interest for the current frame and pairwise angles between the fourth feature points corresponding to the tracked region of interest for the initial or re-initialized frame.

Further to the second embodiments, wherein to determine the effective center of the tracked region of interest for the current frame, the processor is to provide the effective center as an average of differences between each feature point of the selected subset of feature points and a scale and rotation adjusted offset between a corresponding feature point in an initial or re-initialized frame and a third effective center of the tracked region of interest for the initial or re-initialized frame.

Further to the second embodiments, wherein the processor is further to perform motion tracking of fourth feature points corresponding to the tracked region of interest for the previous frame to provide fifth feature points corresponding to the tracked region of interest for the current frame and to filter the fifth feature points corresponding to the tracked region of interest for the current frame to provide the feature points corresponding to the tracked region of interest for the current frame.

Further to the second embodiments, wherein the processor is further to perform motion tracking of fourth feature points corresponding to the tracked region of interest for the previous frame to provide fifth feature points corresponding to the tracked region of interest for the current frame and to filter the fifth feature points corresponding to the tracked region of interest for the current frame to provide the feature points corresponding to the tracked region of interest for the current frame, wherein the processor to filter the fifth feature points comprises the processor to determine a color difference between a window around a particular feature point of the fifth feature points and a second window around a corresponding feature point of the fourth feature points and a depth difference between a third window around the particular feature point of the fifth feature points and a fourth window around the corresponding feature point of the fourth feature points.

Further to the second embodiments, wherein the processor is further to perform motion tracking of fourth feature points corresponding to the tracked region of interest for the previous frame to provide fifth feature points corresponding to the tracked region of interest for the current frame and to filter the fifth feature points corresponding to the tracked region of interest for the current frame to provide the feature points corresponding to the tracked region of interest for the current frame, wherein the processor to filter the fifth feature points comprises the processor to determine a color difference between a window around a particular feature point of the fifth feature points and a second window around a corresponding feature point of the fourth feature points and a depth difference between a third window around the particular feature point of the fifth feature points and a fourth window around the corresponding feature point of the fourth feature points, and wherein the particular feature point is rejected when either the color difference exceeds a first threshold or the depth difference exceeds a second threshold.

Further to the second embodiments, when the effective center of the tracked region of interest for the current frame is accepted, the processor is further to perform motion tracking of the feature points to provide fourth feature points corresponding to the tracked region of interest for a subsequent frame, to filter the fourth feature points corresponding to the tracked region of interest for the subsequent frame to provide fifth feature points corresponding to the tracked region of interest for the subsequent frame, and, when the number of fifth feature points is less than a threshold, to generate a third region of interest for the current frame based on the effective center of the tracked region of interest for the current frame.

Further to the second embodiments, the processor is further to receive a region of interest indicator corresponding to the previous frame and to generate the tracked region of interest for the previous frame based on the region of interest indicator and a region grow operation.

Further to the second embodiments, the processor is further to receive a region of interest indicator corresponding to the previous frame and to generate the tracked region of interest for the previous frame based on the region of interest indicator and a region grow operation, wherein the processor is further to extract sparse feature points based on the tracked region of interest for the previous frame and first feature point extraction parameters and, when a number of the sparse extracted feature points is less than a threshold, to extract second sparse feature points based on the tracked region of interest for the previous frame and second feature point extraction parameters, wherein the first and second feature point extraction parameters are different.

Further to the second embodiments, is further to receive a region of interest indicator corresponding to the previous frame and to generate the tracked region of interest for the previous frame based on the region of interest indicator and a region grow operation, wherein the processor is further to extract sparse feature points based on the tracked region of interest for the previous frame and to determine the second effective center of the tracked region of interest for the previous frame as an average of the sparse feature points.

Further to the second embodiments, the video frames comprise red, green, blue, depth (RGB-D) video frames and the depth comprises at least one of disparity values or depth distance values.

In one or more third embodiments, a system comprises means for determining an effective center of a tracked region of interest for a current frame of the video frames based on a selected subset of feature points corresponding to the tracked region of interest, means for accepting or rejecting the effective center of the tracked region of interest for the current frame based on a comparison of a depth value corresponding to the effective center of the tracked region of interest for the current frame to a second depth value corresponding to a second effective center of the tracked region of interest for a previous frame, means for generating, when the effective center of the tracked region of interest for the current frame is rejected, a second tracked region of interest for the previous frame based on the second effective center of the tracked region of interest for the previous frame, means for determining second feature points corresponding to the second region of interest for the previous frame, and means for performing motion tracking of the second feature points to provide third feature points corresponding to the second tracked region of interest for the current frame.

Further to the third embodiments, the system further comprises means for determining the selected subset of the feature points corresponding to the tracked region of interest comprising means for clustering the feature points based on a difference between each feature point and a scale and rotation adjusted offset between a corresponding feature point in an initial or re-initialized frame and a third effective center of the tracked region of interest for the initial or re-initialized frame to generate a plurality of clusters and means for selecting the selected subset of feature points as a cluster of the plurality of clusters having the most feature points.

Further to the third embodiments, the means for determining the effective center of the tracked region of interest for the current frame comprise means for providing the effective center as an average of differences between each feature point of the selected subset of feature points and a scale and rotation adjusted offset between a corresponding feature point in an initial or re-initialized frame and a third effective center of the tracked region of interest for the initial or re-initialized frame.

Further to the third embodiments, the system further comprises means for performing motion tracking of fourth feature points corresponding to the tracked region of interest for the previous frame to provide fifth feature points corresponding to the tracked region of interest for the current frame and means for filtering the fifth feature points corresponding to the tracked region of interest for the current frame to provide the feature points corresponding to the tracked region of interest for the current frame.

Further to the third embodiments, the system further comprises means for performing motion tracking of fourth feature points corresponding to the tracked region of interest for the previous frame to provide fifth feature points corresponding to the tracked region of interest for the current frame and means for filtering the fifth feature points corresponding to the tracked region of interest for the current frame to provide the feature points corresponding to the tracked region of interest for the current frame, wherein the means for filtering the fifth feature points comprise means for determining a color difference between a window around a particular feature point of the fifth feature points and a second window around a corresponding feature point of the fourth feature points and a depth difference between a third window around the particular feature point of the fifth feature points and a fourth window around the corresponding feature point of the fourth feature points.

Further to the third embodiments, the system further comprises means for receiving a region of interest indicator corresponding to the previous frame and means for generating the tracked region of interest for the previous frame based on the region of interest indicator and a region grow operation.

Further to the third embodiments, the system further comprises means for receiving a region of interest indicator corresponding to the previous frame, means for generating the tracked region of interest for the previous frame based on the region of interest indicator and a region grow operation, means for extracting sparse feature points based on the tracked region of interest for the previous frame and first feature point extraction parameters, and means for extracting, when a number of the sparse extracted feature points is less than a threshold, second sparse feature points based on the tracked region of interest for the previous frame and second feature point extraction parameters, wherein the first and second feature point extraction parameters are different.

In one or more fourth embodiments, at least one machine readable medium comprises a plurality of instructions that, in response to being executed on a device, cause the device to provide region of interest tracking across video frames by determining an effective center of a tracked region of interest for a current frame of the video frames based on a selected subset of feature points corresponding to the tracked region of interest, accepting or rejecting the effective center of the tracked region of interest for the current frame based on a comparison of a depth value corresponding to the effective center of the tracked region of interest for the current frame to a second depth value corresponding to a second effective center of the tracked region of interest for a previous frame, and, when the effective center of the tracked region of interest for the current frame is rejected, generating a second tracked region of interest for the previous frame based on the second effective center of the tracked region of interest for the previous frame, determining second feature points corresponding to the second region of interest for the previous frame, and performing motion tracking of the second feature points to provide third feature points corresponding to the second tracked region of interest for the current frame.

Further to the fourth embodiments, the at least one machine readable medium further comprises a plurality of instructions that, in response to being executed on a device, cause the device to provide region of interest tracking across video frames by determining the selected subset of the feature points corresponding to the tracked region of interest by clustering the feature points based on a difference between each feature point and a scale and rotation adjusted offset between a corresponding feature point in an initial or re-initialized frame and a third effective center of the tracked region of interest for the initial or re-initialized frame to generate a plurality of clusters and selecting the selected subset of feature points as a cluster of the plurality of clusters having the most feature points.

Further to the fourth embodiments, determining the effective center of the tracked region of interest for the current frame comprises providing the effective center as an average of differences between each feature point and a scale and rotation adjusted offset between a corresponding feature point in an initial or re-initialized frame and a third effective center of the tracked region of interest for the initial or re-initialized frame.

Further to the fourth embodiments, the at least one machine readable medium further comprises a plurality of instructions that, in response to being executed on a device, cause the device to provide region of interest tracking across video frames by performing motion tracking of fourth feature points corresponding to the tracked region of interest for the previous frame to provide fifth feature points corresponding to the tracked region of interest for the current frame and filtering the fifth feature points corresponding to the tracked region of interest for the current frame to provide the feature points corresponding to the tracked region of interest for the current frame.

Further to the fourth embodiments, the at least one machine readable medium further comprises a plurality of instructions that, in response to being executed on a device, cause the device to provide region of interest tracking across video frames by receiving a region of interest indicator corresponding to the previous frame and generating the tracked region of interest for the previous frame based on the region of interest indicator and a region grow operation.

Further to the fourth embodiments, the at least one machine readable medium further comprises a plurality of instructions that, in response to being executed on a device, cause the device to provide region of interest tracking across video frames by receiving a region of interest indicator corresponding to the previous frame, generating the tracked region of interest for the previous frame based on the region of interest indicator and a region grow operation, extracting sparse feature points based on the tracked region of interest for the previous frame and first feature point extraction parameters, and, when a number of the sparse extracted feature points is less than a threshold, extracting second sparse feature points based on the tracked region of interest for the previous frame and second feature point extraction parameters, wherein the first and second feature point extraction parameters are different.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method comprising:
   determining an effective center of a tracked region of interest for a current frame of a plurality of video frames based on a selected subset of feature points corresponding to the tracked region of interest, wherein the plurality of video frames comprise color video having depth data;
   accepting or rejecting the effective center of the tracked region of interest for the current frame based on a comparison of a first depth value corresponding to the effective center of the tracked region of interest for the current frame to a second depth value corresponding to a second effective center of the tracked region of interest for a previous frame, wherein the first and second depth values comprise at least one of disparity values or depth distance values; and, when the effective center of the tracked region of interest for the current frame is rejected:
   generating a second tracked region of interest for the previous frame based on the second effective center of the tracked region of interest for the previous frame;
   determining second feature points corresponding to the second region of interest for the previous frame; and
   performing motion tracking of the second feature points to provide third feature points corresponding to the second tracked region of interest for the current frame.

2. The method of claim 1, further comprising determining the selected subset of the feature points corresponding to the tracked region of interest by:
   clustering the feature points based on a difference between each feature point and a scale and rotation adjusted offset between a corresponding feature point in an initial or re-initialized frame and a third effective center of the tracked region of interest for the initial or re-initialized frame to generate a plurality of clusters; and
   selecting the selected subset of feature points as a cluster of the plurality of clusters having the most feature points.

3. The method of claim 2, wherein the scale and rotation adjustments are based on a scaling factor and a rotation factor, the method further comprising:
   determining the scaling factor as a median of ratios of pairwise distances between the feature points corresponding to the tracked region of interest for the current frame and pairwise distances between fourth feature points corresponding to the tracked region of interest for the initial or re-initialized frame; and
   determining the rotation factor as a median of differences of pairwise angles between the feature points corresponding to the tracked region of interest for the current frame and pairwise angles between the fourth feature points corresponding to the tracked region of interest for the initial or re-initialized frame.

4. The method of claim 1, wherein determining the effective center of the tracked region of interest for the current frame comprises:
   providing the effective center as an average of differences between each feature point of the selected subset of feature points and a scale and rotation adjusted offset between a corresponding feature point in an initial or re-initialized frame and a third effective center of the tracked region of interest for the initial or re-initialized frame.

5. The method of claim 1, further comprising:
   performing motion tracking of fourth feature points corresponding to the tracked region of interest for the previous frame to provide fifth feature points corresponding to the tracked region of interest for the current frame; and filtering the fifth feature points corresponding to the tracked region of interest for the current frame to provide the feature points corresponding to the tracked region of interest for the current frame.

6. The method of claim 5, wherein filtering the fifth feature points comprises determining a color difference between a window around a particular feature point of the fifth feature points and a second window around a corresponding feature point of the fourth feature points and a depth difference between a third window around the particular feature point of the fifth feature points and a fourth window around the corresponding feature point of the fourth feature points.

7. The method of claim 6, wherein the particular feature point is rejected when either the color difference exceeds a first threshold or the depth difference exceeds a second threshold.

8. The method of claim 1, further comprising, when the effective center of the tracked region of interest for the current frame is accepted:

performing motion tracking of the feature points to provide fourth feature points corresponding to the tracked region of interest for a subsequent frame;

filtering the fourth feature points corresponding to the tracked region of interest for the subsequent frame to provide fifth feature points corresponding to the tracked region of interest for the subsequent frame; and, when the number of fifth feature points is less than a threshold:

generating a third region of interest for the current frame based on the effective center of the tracked region of interest for the current frame.

9. The method of claim 1, further comprising:

receiving a region of interest indicator corresponding to the previous frame; and generating the tracked region of interest for the previous frame based on the region of interest indicator and a region grow operation.

10. The method of claim 9, further comprising:

extracting sparse feature points based on the tracked region of interest for the previous frame and first feature point extraction parameters; and, when a number of the sparse extracted feature points is less than a threshold:

extracting second sparse feature points based on the tracked region of interest for the previous frame and second feature point extraction parameters, wherein the first and second feature point extraction parameters are different.

11. The method of claim 9, further comprising:

extracting sparse feature points based on the tracked region of interest for the previous frame; and determining the second effective center of the tracked region of interest for the previous frame as an average of the sparse feature points.

12. The method of claim 1, wherein the plurality of video frames comprise red, green, blue, depth (RGB-D) video frames.

13. A system comprising:

a memory configured to store a plurality of video frames; and a processor coupled to the memory, the processor to determine an effective center of a tracked region of interest for a current frame of the plurality of video frames based on a selected subset of feature points corresponding to the tracked region of interest, to accept or reject the effective center of the tracked region of interest for the current frame based on a comparison of a first depth value corresponding to the effective center of the tracked region of interest for the current frame to a second depth value corresponding to a second effective center of the tracked region of interest for a previous frame, and, when the effective center of the tracked region of interest for the current frame is rejected, to generate a second tracked region of interest for the previous frame based on the second effective center of the tracked region of interest for the previous frame, to determine second feature points corresponding to the second region of interest for the previous frame, and to perform motion tracking of the second feature points to provide third feature points corresponding to the second tracked region of interest for the current frame.

14. The system of claim 13, wherein the processor is further to determine the selected subset of the feature points corresponding to the tracked region of interest, wherein to determine the selected subset of the feature points, the processor is to cluster the feature points based on a difference between each feature point and a scale and rotation adjusted offset between a corresponding feature point in an initial or re-initialized frame and a third effective center of the tracked region of interest for the initial or re-initialized frame to generate a plurality of clusters and to select the selected subset of feature points as a cluster of the plurality of clusters having the most feature points.

15. The system of claim 13, wherein to determine the effective center of the tracked region of interest for the current frame, the processor is to provide the effective center as an average of differences between each feature point of the selected subset of feature points and a scale and rotation adjusted offset between a corresponding feature point in an initial or re-initialized frame and a third effective center of the tracked region of interest for the initial or re-initialized frame.

16. The system of claim 13, wherein the processor is further to perform motion tracking of fourth feature points corresponding to the tracked region of interest for the previous frame to provide fifth feature points corresponding to the tracked region of interest for the current frame and to filter the fifth feature points corresponding to the tracked region of interest for the current frame to provide the feature points corresponding to the tracked region of interest for the current frame.

17. The system of claim 16, wherein the processor to filter the fifth feature points comprises the processor to determine a color difference between a window around a particular feature point of the fifth feature points and a second window around a corresponding feature point of the fourth feature points and a depth difference between a third window around the particular feature point of the fifth feature points and a fourth window around the corresponding feature point of the fourth feature points.

18. The system of claim 13, wherein the processor is further to receive a region of interest indicator corresponding to the previous frame and to generate the tracked region of interest for the previous frame based on the region of interest indicator and a region grow operation.

19. The system of claim 18, wherein the processor is further to extract sparse feature points based on the tracked region of interest for the previous frame and first feature point extraction parameters and, when a number of the sparse extracted feature points is less than a threshold, to extract second sparse feature points based on the tracked region of interest for the previous frame and second feature point extraction parameters, wherein the first and second feature point extraction parameters are different.

20. At least one non-transitory machine readable medium comprising a plurality of instructions that, in response to being executed on a device, cause the device to provide region of interest tracking across video frames by:
  determining an effective center of a tracked region of interest for a current frame of the video frames based on a selected subset of feature points corresponding to the tracked region of interest;
  accepting or rejecting the effective center of the tracked region of interest for the current frame based on a comparison of a first depth value corresponding to the effective center of the tracked region of interest for the current frame to a second depth value corresponding to a second effective center of the tracked region of interest for a previous frame; and, when the effective center of the tracked region of interest for the current frame is rejected:
    generating a second tracked region of interest for the previous frame based on the second effective center of the tracked region of interest for the previous frame;
    determining second feature points corresponding to the second region of interest for the previous frame; and
    performing motion tracking of the second feature points to provide third feature points corresponding to the second tracked region of interest for the current frame.

21. The machine readable medium of claim 20 further comprising a plurality of instructions that, in response to being executed on the device, cause the device to provide region of interest tracking across video frames by:
  determining the selected subset of the feature points corresponding to the tracked region of interest by clustering the feature points based on a difference between each feature point and a scale and rotation adjusted offset between a corresponding feature point in an initial or re-initialized frame and a third effective center of the tracked region of interest for the initial or re-initialized frame to generate a plurality of clusters and selecting the selected subset of feature points as a cluster of the plurality of clusters having the most feature points.

22. The machine readable medium of claim 20, wherein determining the effective center of the tracked region of interest for the current frame comprises:
  providing the effective center as an average of differences between each feature point and a scale and rotation adjusted offset between a corresponding feature point in an initial or re-initialized frame and a third effective center of the tracked region of interest for the initial or re-initialized frame.

23. The machine readable medium of claim 20 further comprising a plurality of instructions that, in response to being executed on the device, cause the device to provide region of interest tracking across video frames by:
  performing motion tracking of fourth feature points corresponding to the tracked region of interest for the previous frame to provide fifth feature points corresponding to the tracked region of interest for the current frame; and
  filtering the fifth feature points corresponding to the tracked region of interest for the current frame to provide the feature points corresponding to the tracked region of interest for the current frame.

24. The machine readable medium of claim 20 further comprising a plurality of instructions that, in response to being executed on the device, cause the device to provide region of interest tracking across video frames by:
  receiving a region of interest indicator corresponding to the previous frame; and
  generating the tracked region of interest for the previous frame based on the region of interest indicator and a region grow operation.

25. The machine readable medium of claim 24 further comprising a plurality of instructions that, in response to being executed on the device, cause the device to provide region of interest tracking across video frames by:
  extracting sparse feature points based on the tracked region of interest for the previous frame and first feature point extraction parameters; and, when a number of the sparse extracted feature points is less than a threshold:
    extracting second sparse feature points based on the tracked region of interest for the previous frame and second feature point extraction parameters, wherein the first and second feature point extraction parameters are different.

* * * * *